(12) United States Patent
Lo et al.

(10) Patent No.: US 12,143,481 B2
(45) Date of Patent: *Nov. 12, 2024

(54) METHOD AND SYSTEM FOR KEY GENERATION

(71) Applicant: THE GOVERNING COUNCIL OF THE UNIVERSITY OF TORONTO, Toronto (CA)

(72) Inventors: Hoi-Kwong Lo, Toronto (CA); Mattia Montagna, Certosa di Pavia (IT)

(73) Assignee: THE GOVERNING COUNCIL OF THE UNIVERSITY OF TORONTO, Toronto (CA)

(*) Notice: Subject to any disclaimer, the term of this patent is extended or adjusted under 35 U.S.C. 154(b) by 384 days.

This patent is subject to a terminal disclaimer.

(21) Appl. No.: 17/500,199

(22) Filed: Oct. 13, 2021

(65) Prior Publication Data

US 2022/0103355 A1 Mar. 31, 2022

Related U.S. Application Data

(63) Continuation-in-part of application No. 17/038,819, filed on Sep. 30, 2020, now Pat. No. 11,177,950.

(Continued)

(30) Foreign Application Priority Data

Dec. 5, 2019 (GB) .................................... 1917748

(51) Int. Cl.
*H04L 9/08* (2006.01)
*H04L 9/06* (2006.01)
*H04L 9/32* (2006.01)

(52) U.S. Cl.
CPC .......... *H04L 9/0861* (2013.01); *H04L 9/0656* (2013.01); *H04L 9/3242* (2013.01)

(58) Field of Classification Search
CPC .... H04L 9/0861; H04L 9/0656; H04L 9/3242
See application file for complete search history.

(56) References Cited

U.S. PATENT DOCUMENTS 5,982,896 A 11/1999 Cordery et al.
8,568,224 B1 10/2013 Itkis et al.
(Continued)

FOREIGN PATENT DOCUMENTS

CA 3078558 A1 4/2019
CA 3107237 C 1/2022
(Continued)

OTHER PUBLICATIONS

Combined Search and Examination Report, Intellectual Property Office of the United Kingdom, Aug. 19, 2020.
(Continued)

*Primary Examiner* — Vance M Little
(74) *Attorney, Agent, or Firm* — Bhole IP Law; Anil Bhole; Marc Lampert

(57) ABSTRACT

Systems and methods for key generation between a first user computing device and a second user computing device without requiring direct communication during key generation. The method using a plurality of third-party providers and a first private table and a second private table. The method including: performing by the second user computing device: receiving indexes each associated with a value in the second private table, each index received from the respective third-party provider sharing those values, each index associated with a value that matches an indexed value in the first private table received by the respective third-party provider from the first user computing device; and generating a common key by combining the indexed values of the second private table.

20 Claims, 11 Drawing Sheets

Related U.S. Application Data

(60) Provisional application No. 62/907,997, filed on Sep. 30, 2019.

(56) References Cited

U.S. PATENT DOCUMENTS

| | | |
|---|---|---|
| 11,177,950 B2 | 11/2021 | Lo et al. |
| 2004/0030932 A1 | 2/2004 | Juels et al. |
| 2006/0205388 A1 | 9/2006 | Semple et al. |
| 2008/0307110 A1 | 12/2008 | Wainner et al. |
| 2009/0067629 A1 | 3/2009 | Kraszewski |
| 2010/0211787 A1 | 8/2010 | Bukshpun |
| 2010/0246811 A1 | 9/2010 | Sadler |
| 2012/0204032 A1 | 8/2012 | Wilkins et al. |
| 2013/0159731 A1* | 6/2013 | Furukawa ............. G06F 21/602 713/189 |
| 2013/0262858 A1 | 10/2013 | Neuman et al. |
| 2014/0369498 A1 | 12/2014 | Hammersmith |
| 2015/0134947 A1 | 5/2015 | Varcoe et al. |
| 2015/0142836 A1 | 5/2015 | Borges et al. |
| 2015/0220751 A1* | 8/2015 | Syben ................. G06F 11/1471 713/193 |
| 2015/0295907 A1 | 10/2015 | Abrahamson |
| 2017/0180117 A1 | 6/2017 | Tomkow |
| 2018/0109372 A1 | 4/2018 | Fu |
| 2018/0150647 A1 | 5/2018 | Naqvi et al. |
| 2018/0219677 A1 | 8/2018 | Nair et al. |
| 2018/0367298 A1 | 12/2018 | Wright et al. |
| 2019/0044923 A1 | 2/2019 | Thompson et al. |
| 2019/0089687 A1 | 3/2019 | Fiske |
| 2020/0320227 A1 | 10/2020 | Sadjadpour |
| 2020/0328886 A1 | 10/2020 | Newton et al. |
| 2021/0099296 A1 | 4/2021 | Lo et al. |
| 2021/0232702 A1 | 7/2021 | Gelbard |
| 2022/0021521 A1 | 1/2022 | Shamai et al. |

FOREIGN PATENT DOCUMENTS

| | | |
|---|---|---|
| JP | 2012147341 A | 8/2012 |
| WO | 2019069103 A1 | 4/2019 |
| WO | 2019076737 A1 | 4/2019 |

OTHER PUBLICATIONS

"BCC Research Quantum Patent Review", BCC Research LLC, 2019, 177-192.
"BCC Research Quantum Report", Quantum Computing: Technologies and Global Markets to 2022, Aug. 2018.
Curty, Marcos, et al., "Foiling covert channels and malicious classical post-processing units in quantum key distribution", Quantum Information, 2019.
International Search Report corresponding to PCT/CA2020/051307; Canadian Intellectual Property Office; issued Nov. 25, 2020.
Written Opinion for PCT/CA2020/051307, Canadian Intellectual Property Office, issued Nov. 25, 2020.
Feihu Xu. et al., "Secure quantum key distribution with realistic devices," Rev. Mod. Phys. 92, 025002 (2020).
Haowen Chan, et al., "Random key predistribution schemes for sensor networks," 2003 Symposium on Security and Privacy, 2003., 2003, pp. 197-213.
Notice of Allowance for U.S. Appl. No. 18/491,415, USPTO, dated: Jan. 17, 2024.
Examination Report for UK application No. GB2102574.7, UKIPO, dated: Jun. 22, 2021.
Extended European Search Report for EU application No. 20872410.4, EPO, dated: Oct. 19, 2023.
Notice of Allowance for Canadian application No. 3,107,237, CIPO, dated: Apr. 8, 2021.
Notice of Allowance for U.S. Appl. No. 17/038,819, USPTO, dated: Aug. 23, 2021.
Office Action for Japanese application No. 2022-519684, Japan Patent Office, drafted: Dec. 8, 2023, mailed: Dec. 12, 2023.
Office Action for U.S. Appl. No. 17/038,819, USPTO, dated: Dec. 23, 2020.
Office Action for U.S. Appl. No. 17/038,819, USPTO, dated: Apr. 7, 2021.
Cavaiani, Charles , et al., "Mutual authenticating protocol with key distribution in client/server environment", XRDS: Crossroads, The ACM Magazine for Students, vol. 2, Issue Mar. 4, 1996, pp. 17-22 (Year: 1996).
Siegel, David A. , et al., "Dealing with key challenges in international usability and user research", CHI EA '07: CHI '07 Extended Abstracts on Human Factors in Computing Systems. Apr. 2007, pp. 2145-2148 (Year: 2007).
Wei, Min , et al., "A mutual authentication scheme with key agreement for industrial wireless network", ICUIMC '11: Proceedings of the 5th International Conference on Ubiquitous Information Management and Communication. Feb. 2011, Article No. 23, pp. 1-8 (Year: 2011).
International Search Report for PCT application No. PCT/CA2023/051400, CIPO, search completed: Dec. 21, 2023, mailed: Jan. 5, 2024.
Notice of Allowability for U.S. Appl. No. 18/491,415, USPTO, dated: Feb. 22, 2024.
Office Action for Israeli application No. 291804, Israel Patent Office, dated: Jun. 23, 2024.
Office Action for Japanese application No. 2022-519684, Japan Patent Office, dated: May 21, 2024.
Written Opinion of the International Searching Authority for PCT application No. PCT/CA2023/051400, CIPO, opinion completed: Jan. 4, 2024, mailed: Jan. 5, 2024.

\* cited by examiner

METHOD AND SYSTEM FOR KEY GENERATION

TECHNICAL FIELD

The following relates to data communication systems and encryptions schemes utilized in such systems; and more specifically, to a method and system for key generation.

BACKGROUND

Data communication systems are used to exchange information between devices. The information to be exchanged comprises data that is organized as strings of digital bits formatted so as to be recognizable by other devices and to permit the information to be processed and/or recovered. The exchange of information may occur over a publicly accessible network, such as a communication link between two devices, over a dedicated network within an organization, or may be between two devices within the same dedicated component, such as within a computer or point of sale device. A large number of communication protocols have been developed to allow the exchange of data between different devices. The communication protocols permit the exchange of data in a robust manner, often with error correction and error detection functionality, and for the data to be directed to the intended recipient and recovered for further use. Because the data may be accessible to other devices, it is vulnerable to interception and observation or manipulation. The sensitive nature of the information requires that steps are taken to secure the information and ensure its secrecy, commonly using various types of encryption schemes. Other goals of information security can include, for example, authentication and digital signature.

Various encryption schemes, such as advanced encryption standard (AES), are based on computational assumptions, which may be susceptible to be broken by advances in algorithms and hardware. For example, the emergence of quantum computers provides a substantial leap in computing ability. However, adversaries or interlopers looking to intercept the encrypted communication may also gain access to the power of quantum computing to break encryption and gain access to supposedly secured communications. For medium-term and long-term security, this can present a significant challenge because an interloper or eavesdropper (an entity referred to as "Eve") might save communications sent now and wait for the proliferation of algorithms and hardware some years or decades later that can decode present encryption schemes.

It is therefore an object of the present invention to provide systems and methods in which the above disadvantages are obviated or mitigated and attainment of the desirable attributes is facilitated.

SUMMARY

In an aspect, there is provided a method for key generation between a first user computing device and a second user computing device without requiring direct communication during key generation between the first user computing device and the second user computing device, the method for key generation using a plurality of third-party providers each comprising a computing device, the method for key generation using a first private table comprising values with associated indexes each shared with the first user computing device and one of the third-party providers and a second private table comprising values with associated indexes each shared with the second user computing device and one of the third-party providers, the method comprising: performing by the second user computing device: receiving indexes each associated with a value in the second private table, each index received from the respective third-party provider sharing those values, each index associated with a value that matches an indexed value in the first private table received by the respective third-party provider from the first user computing device; and generating a common key by combining the indexed values of the second private table.

In a particular case of the method, generating the common key comprises performing exclusive-or (XOR) operations on the indexed values of the second private table.

In another case of the method, the method further comprising using the common key to securely communicate between the first user computing device and the second user computing device using a one-time-pad (OTP) encryption approach.

In yet another case of the method, the number of indexed values represent the number of bits to be communicated by the first user computing device to the second user computing device.

In yet another case of the method, the method further comprising using the common key to authenticate communications between the first user computing device and the second user computing device using a Wegman-Carter approach In yet another case of the method, the method further comprising marking as used, by the second user computing device, values in the second private table that have been used to generate the common key.

In yet another case of the method, the method further comprising performing erasure, by the second user computing device, of values in the second private table that have been used to generate the common key.

In yet another case of the method, the method further comprising authenticating, by the second user computing device, the common key using an authentication service.

In yet another case of the method, the method further comprising performing, by the second user computing device, privacy amplification comprising applying a linear matrix to the common key.

In yet another case of the method, receiving the indexes associated with the values in the second private table comprises receiving values determined by performing exclusive-or (XOR) operations, by each respective third-party provider, on the indexed values in the first private table and the second private table.

In yet another case of the method, the method further comprising performing, by the second computing device, encryption of messages using the common key.

In yet another case of the method, the method further comprising performing, by the second user computing device, private key authentication using the common key In another aspect, there is provided a system for key generation with a first user computing device without requiring direct communication during key generation with the first user computing device, the system comprising one or more processors and a data storage, the system in communication with one or more third-party providers each comprising a computing device, a first private table comprising values with associated indexes each shared with the first user computing device and one of the third-party providers, the one or more processors in communication with the data storage device and configured to execute: a table module for receiving indexes each associated with a value in a second private table, the second private table comprising values with associated indexes each shared with one of the third-party providers, each index received from the respective third-party provider sharing those values, each index associated with a value that matches an indexed value in the first private table received by the respective third-party provider from the first user computing device; and a common key module for generating a common key by combining the indexed values of the second private table.

In a particular case of the system, the common key module generates the common key by performing exclusive-or (XOR) operations on the indexed values of the second private table.

In another case of the system, the one or more processors are further configured to execute a communication module to use the common key to securely communicate with the first user computing device using a one-time-pad (OTP) encryption approach.

In yet another case of the system, the number of indexed values represent the number of bits to be communicated by the first user computing device.

In yet another case of the system, the one or more processors are further configured to execute a communication module to use the common key to authenticate communications between the first user computing device and the second user computing device using a Wegman-Carter approach.

In yet another case of the system, the table module marks, as used, values in the second private table that have been used to generate the common key.

In yet another case of the system, the one or more processors are further configured to execute an erasure module to perform erasure of values in the second private table that have been used to generate the common key.

In yet another case of the system, the one or more processors are further configured to execute an authentication module to authenticate the common key using an authentication service.

In yet another case of the system, the one or more processors are further configured to execute an amplification module to perform privacy amplification comprising applying a linear matrix to the common key.

In yet another case of the system, receiving the indexes associated with the values in the second private table comprises receiving values determined by performing exclusive-or (XOR) operations, by each respective third-party provider, on the indexed values in the first private table and the second private table.

In yet another case of the system, the one or more processors are further configured to perform encryption of messages using the common key.

In yet another case of the system, the one or more processors are further configured to perform private key authentication using the common key.

These and other aspects are contemplated and described herein. The foregoing summary sets out representative aspects of systems and methods to assist skilled readers in understanding the following detailed description.

DESCRIPTION OF THE DRAWINGS

An embodiment of the present invention will now be described by way of example only with reference to the accompanying drawings, in which.

DETAILED DESCRIPTION

Figure 1:
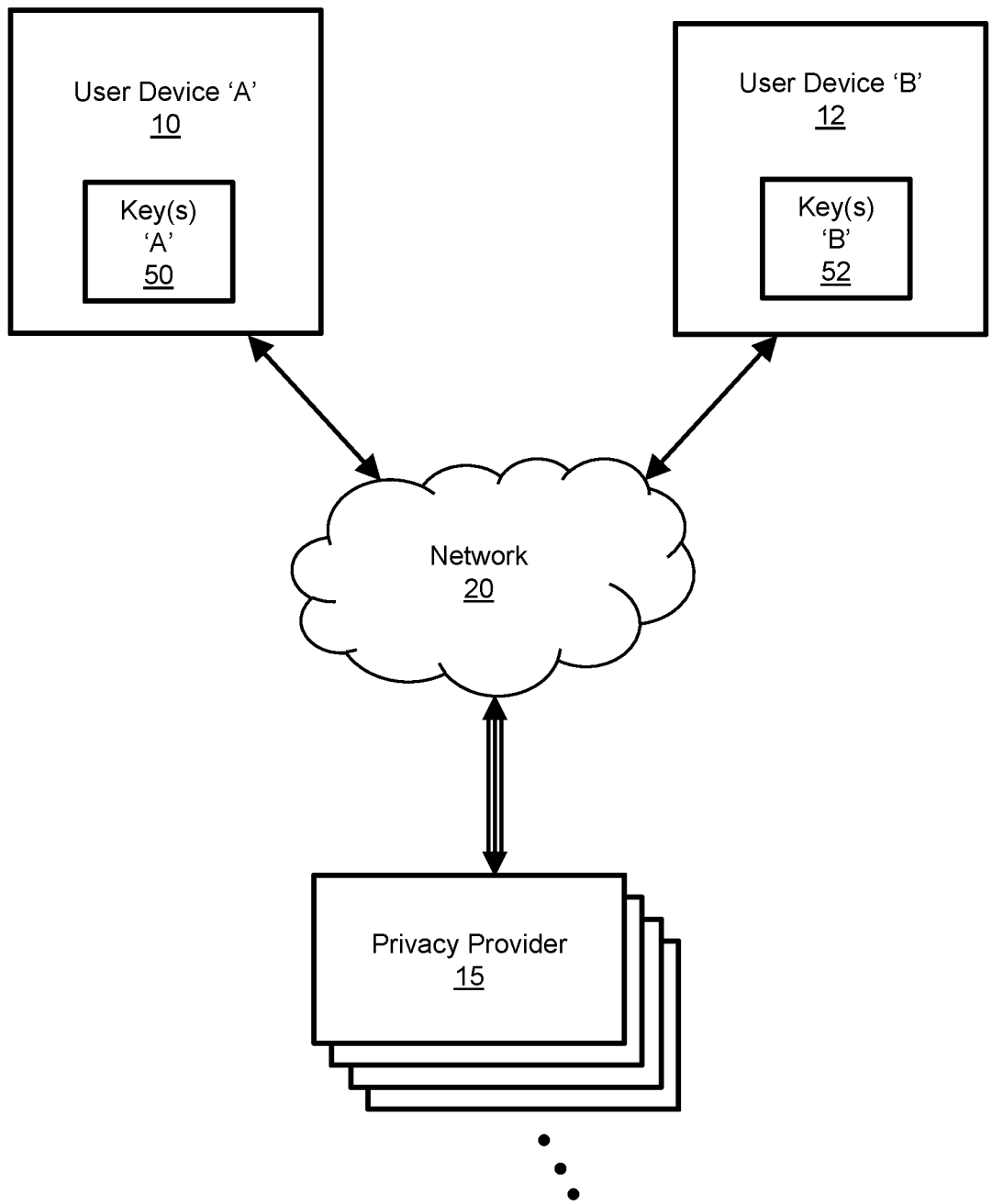
FIG. 1 is a conceptual diagram of a computing environment for key generation, according to an embodiment.

Embodiments will now be described with reference to the figures. It will be appreciated that for simplicity and clarity of illustration, where considered appropriate, reference numerals may be repeated among the figures to indicate corresponding or analogous elements. In addition, numerous specific details are set forth in order to provide a thorough understanding of the embodiments described herein. However, it will be understood by those of ordinary skill in the art that the embodiments described herein may be practiced without these specific details. In other instances, well-known methods, procedures and components have not been described in detail so as not to obscure the embodiments described herein. Also, the description is not to be considered as limiting the scope of the embodiments described herein.

It will also be appreciated that any module, unit, component, server, computer, computing device, mechanism, terminal or other device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Examples of computer storage media include RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by an application, module, or both. Any such computer storage media may be part of the device or accessible or connectable thereto. Any application or module herein described may be implemented using computer readable/executable instructions that may be stored or otherwise held by such computer readable media and executed by the one or more processors.

The following relates to data communication systems and encryptions schemes utilized in such systems; and more specifically, to a method and system for key generation for secure communication.

Cyber-security is considered by many among the most important public assets. Many Encryption schemes are employed ubiquitously for digital communication and are generally based upon some computational assumptions about a hypothetical eavesdropper or interloper. An example is the widely used RSA (Rivest-Shamir-Adleman) protocol, which assumes the intractability to factorize a large integer into its two prime factors. For an adversary in possession of this decomposition, the communication between the parties involved would appear totally transparent. In 1994, an efficient quantum algorithm for factoring large integers was discovered; thus breaking the RSA scheme. Problematically, a malicious eavesdropper could easily store current encrypted communications, and in the future, use advances in technology to then decrypt the information.

In various approaches, the two communicating computing entities (referred to as Alice and Bob) must pre-share a quantum string; for example, via quantum key distribution (QKD) techniques. Advantageously, the present embodiments can, in some cases, substitute having to pre-share via QKD and the inherent risks that pre-sharing necessitates; and thus, does not necessitate any pre-shared material directly between Alice and Bob. While some approaches use a Certification Authority (CA) to support authentication and help Alice and Bob generation of keys, such approaches using CA generally either rely on computational assumptions to guarantee security against a potential enemy, or they generally still require pre-sharing material between Alice and Bob to generate the key.

Generally, one-time-pad (OTP) approaches offer information theoretical security from an eavesdropper. However, it would likely be naive to trust any party to distribute keys necessary for communication in a key-agreement scheme. Embodiments of the present disclosure address this substantial challenge, among others. Protocols for securitization of data provided herein can substantially reduce the probability of having data breaches or denial of service (DoS) attacks by using a protocol unrelated to the time and computational resources of Eve. Furthermore, protocols for securitization of data provided herein can be considered to be secure against most computational attacks, including quantum computing attacks.

The one-time-pad (OTP) approach generally offers information-theoretic security. For the one-time-pad approach, two communicating parties share a random key only known to the two of them; thus, they can communicate safely by using the key to encrypt a message. Any eavesdropper listening to their conversation would generally not be able to, by any means, distinguish the intercepted messages from random noise. Thus, the communication is informational-theoretic secure. However, a substantial technical challenge is distributing the secret key between any two parties; known as the key distribution problem. In a particular approach, a key provider entity can fulfill this service by distributing a secret key to any two parties requiring the key. However, such a protocol would require total trust on the key provider entity, as that entity could easily use the provided key to access all communication between the two parties. Furthermore, such a configuration introduces a single point of failure, which is particularly dangerous in most practical situations.

Recently, one time pad encryption is becoming much cheaper due to the cost of hard drives and computer memories dropping exponentially. However, scalability is generally an issue for various approaches to OTP. The present embodiments can make OTP encryption widespread by providing a key management layer for OTP; and thus solve the scalability issue.

Embodiments of the present disclosure provide a protocol for key distribution, while, advantageously, not requiring full trust on any particular agent or entity involved in the protocol. The present embodiments provide a protocol that represents an informational-theoretically secure mobile communication protocol that can be used for peer-to-peer encrypted communication.

Embodiments of the present disclosure use a certain number of entities or parties, referred to as third-party providers. In order to decrypt data exchanges between any two parties using this protocol for communication, or to access private data stored on a server, it would necessitate compelling or coordinating a large fraction of the third-party providers. In an example, this possibility can be substantially minimized by locating different third-party providers in different countries; for example, ones in Switzerland, Panama, Cyprus, Canada, U.S.A., and Germany. In this way, no Government alone can effectively legally enforce data disclosure. In further cases, heavy financial forfeitures can be levied on third-party providers in case of disclosures. Advantageously, the protocol of the present disclosure defines a communication protocol in which cybersecurity does not rely on computational assumptions; and thus, can be considered safe against future potential attacks due to advances in technology (such as by quantum computers).

In the protocol of the present disclosure, given a first party (referred to as A or Alice) and a second party (referred to as B or Bob) who want to communicate, the third-party providers can be collectively used to generate the common key necessary for the parties to communicate using, for example, OTP encryption.

In some cases, a key agreement phase of the protocol may require at least a subset of the third-party providers to be online; however, actual communication between parties A and B can occur after the key agreement phase when it is not required that the third-party providers are online. In some cases, the protocol described herein can be initiated to set up a network of privately shared keys among parties that may have never met each other, and those keys can be used at a point in the future to communicate, even if the third-party providers are offline. Advantageously, each party need only communicate with a limited number of the third-party providers, but can still have key distribution with any other party using the scheme; effectively obtaining the same outcomes as a bilateral key exchange.

Advantageously, the protocol of the present embodiments can achieve information-theoretic secure communication under no computational assumptions. Also advantageously, the protocol of the present embodiments only requires at least one of the third-party providers to be uncorrupted and uncompromised. Also advantageously, the protocol of the present embodiments can be future-proof such that if encrypted data stolen today can likely be considered safe against future attacks. In this way, the protocol of the present embodiments can be considered quantum secure, even in view of future advancements in technology.

FIG. 1 shows, in an example embodiment, a diagram of a computing environment can include a first user computing device 10 (referred to as 'A', 'Alice', or first correspondent device) interconnected by a network 20 of communication links to a second user computing device 12 (referred to as 'B', 'Bob', or second correspondent device). The example environment also includes one or more third-party providers 15 in communication with the network 20. The network can be any suitable communication architecture; for example, the Internet, a wide-area-network, a local-area-network, a mobile communication structure, or the like. The communication links may be any suitable communication approach; for example, fixed telephone lines, wireless connections, near field communication connections, or other forms of communication. The devices 10, 12 and the third-party providers 15 may executed on any suitable type of computing device; for example, a desktop computer, a laptop computer, a tablet, a smartphone, a wearable device, an internet-of-things (IOT) device, a server, a distributed computing system, a dedicated piece of hardware, and the like.

Figure 2:
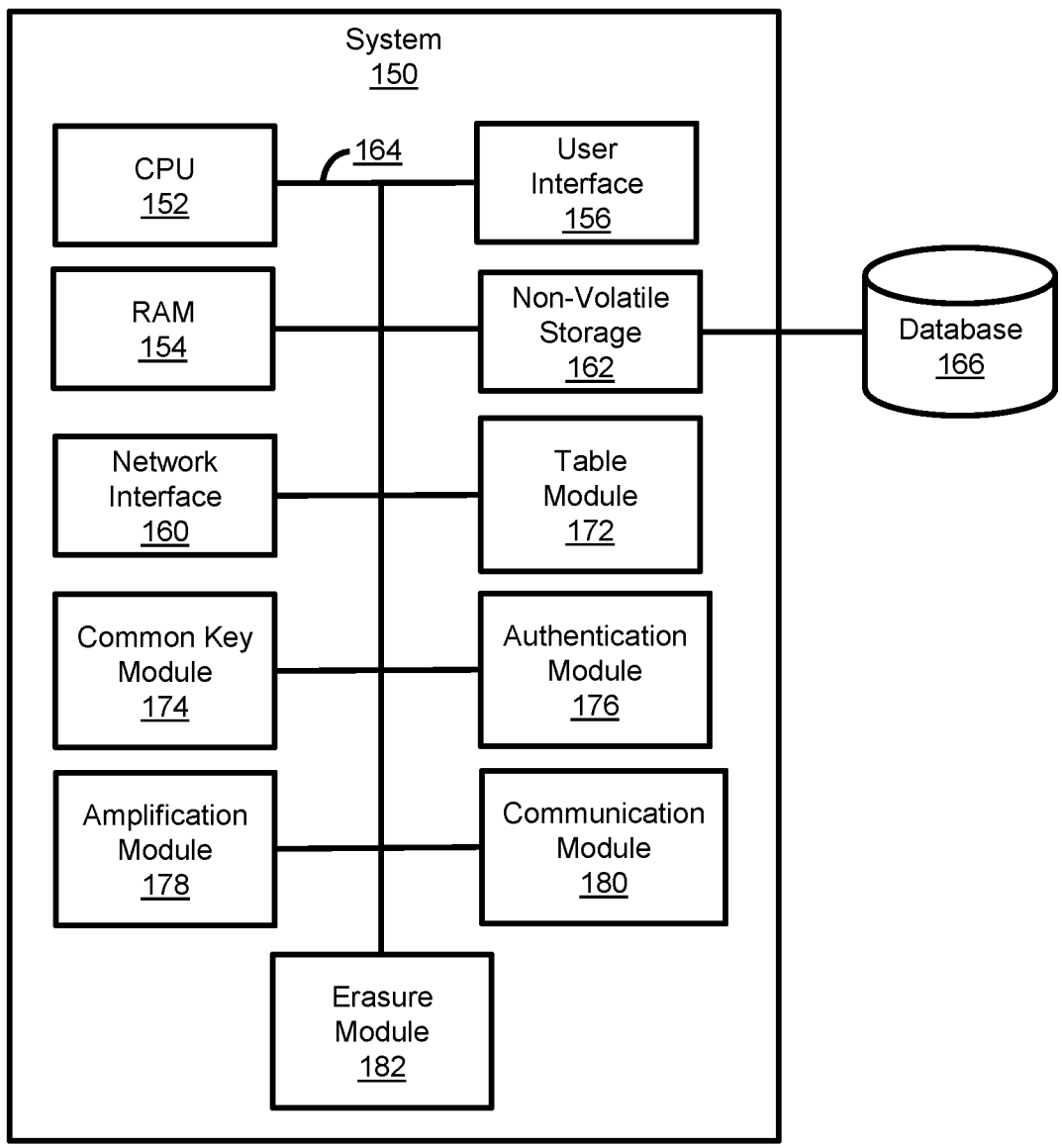
FIG. 2 is a conceptual diagram of a system for key generation, according to an embodiment.

Turning to FIG. 2, shown is a diagram of a system 150 for key generation for secure communication, according to an embodiment. In this embodiment, the system 150 is run on a single computing device 10, 12. In further embodiments, the functions of the system 150 can be run on multiple devices 10, 12, and/or the third-party providers 15. In other embodiments, the components of the system 150 can be distributed among two or more computer systems that may be locally or remotely distributed; for example, using cloud-computing resources.

FIG. 2 shows various physical and logical components of an embodiment of the system 150. As shown, the system 150 has a number of physical and logical components, including a central processing unit ("CPU") 152 (comprising one or more processors), random access memory ("RAM") 154, a user interface 156, a network interface 160, non-volatile storage 162, and a local bus 164 enabling CPU 152 to communicate with the other components. CPU 152 executes an operating system, and various modules, as described below in greater detail. RAM 154 provides relatively responsive volatile storage to CPU 152. The user interface 156 enables an administrator or user to provide input via an input device, for example a mouse or a touchscreen. The user interface 156 also outputs information to output devices; for example, a display. The network interface 160 permits communication with the network 20 or other computing devices and servers remotely located from the system 150. Non-volatile storage 162 stores the operating system and programs, including computer-executable instructions for implementing the operating system and modules, as well as any data used by these services. Additional stored data can be stored in a database 166. During operation of the system 150, the operating system, the modules, and the related data may be retrieved from the non-volatile storage 162 and placed in RAM 154 to facilitate execution.

In an embodiment, the system 150 further includes a number of conceptual modules to be executed on the one or more processors 152, including a table module 172, a common key module 174, an authentication module 176, an amplification module 178, a communication module 180, and an erasure module 182.

Advantageously, in some cases, hardware comprising critical cryptographic information, for example pre-installed keys and any additional generated keys, can be physically separated from hardware performing steps of the protocol described herein. For example, hardware security modules (HSMs) may be used for storing key materials and/or performing secure cryptographic operations. In this way, a physical layer of cyber-security can guarantee that access to encrypted data is restricted to a final user 10, 12.

In embodiments of the present disclosure, one or more keys 50 can be stored by user 'A' and one or more keys 52 can be stored by user 'B'. In some cases, these keys can be installed on the computing device 10, 12 itself, or a separate device collocated with the respective correspondent device, enabling a one-time pad (OTP) encryption scheme for any communication taking place from/to each device. In some cases, a large quantity of keys can be stored with the devices prior to it being received by a user of the respective device.

The system 150 can use a random number generator (RNG) to generate a plurality of random numbers. In some cases, the RNG can be a quantum random number generator (QRNG) based on natural inputs, for example, light. Some eavesdroppers try to find deficiencies in pseudo-RNG to break the encryption. Accordingly, using a QRNG can create a defense against such class of attacks. In an example, it has been determined that it is possible to implement a QRNG using a camera of a smartphone, and it can produce random bit rates greater than 1 Mbps.

In an embodiment, the protocol includes two phases: 1) key distribution phase, and 2) key agreement phase. At the end of the protocol, two devices, Alice 10 and Bob 12, share a common key which can then be used for, for example, secure communication via one-time-pad (OTP). Generation of the keys and physical distribution of the keys to the users from the third-party providers, is referred to as a first phase of the protocol: the key distribution phase.

For the key distribution phase, consider the two devices, Alice 10 and Bob 12, connected to the communication network 20. Also consider a set of n third-party providers 15 $P_1, P_2, \ldots, P_n$. Alice's device is equipped with n tables of keys, $K_1, K_2, \ldots, K_n$, where $K_i = \{0, 1\}^l$ and l is very large. In some cases, those tables of keys can be previously installed on Alice's device before she gained access to it. Table $K_i$ was provided by the i-th third-party provider $P_i$ at construction time; in this way, Alice and $P_i$ are the only devices in possession of $K_i$. This strict dual-possession is true for every table of keys. In most cases, each table of keys is shared with the respective user and only one of the third-party providers. Similarly for Bob, he also shares n tables of keys with then third-party providers. We call $H_1$, $H_2, \ldots, H_n$ the tables of keys known only by $P_i$ and B, where $H_i = \{0, 1\}^l$ and l is very large. In particular, table $H_i$ was provided to Bob by the i-th third-party provider $P_i$ at the time of construction; in this way, Bob and $P_i$ are the only devices in possession of $H_i$. Let us denote by $K_{(i,j)}$, the j-th bit of $K_i$ (and similarly, by $H_{(i,j)}$, the j-th bit of $H_i$. As described herein, indexes are associated with one value in the tables of keys. For example, for Bob, the indexes (3;28) will be assigned to corresponding value H3,28, which is the 28th value in the table H3 uniquely shared between Bob and P3. The value H3,28 can either be 0 or 1. While the present disclosure generally refers to each index referring to a single bit as the associated value, it is understood that the value can be any suitable denomination; for example, a bit, a byte, a number or series of numbers, an alphanumeric digit or series of digits, or the like.

The tables of keys $K_1, K_2, \ldots, K_n$ held by Alice, are permitted to be different from the tables of keys $H_1$, $H_2, \ldots, H_n$ held by Bob. This is advantageous in a network setting with many users (e.g. 10 or 1 million users) where it may not be feasible for each user to share some tables of keys with all other users. By allowing the tables of keys to be different, the approach of the present embodiments is highly scalable in a network setting.

In a second phase of the protocol, the key agreement phase, Alice and Bob wish to achieve the sharing of a common key $k_{AB}$ between each other, in some cases, without any single data provider having access to the value of $k_{AB}$. In an embodiment, this second phase of the protocol can comprise four parts: "Authentication", "Key distribution", "Key authenticity control" and "Privacy amplification."

As a result of the second phase, the two parties, Alice 10 and Bob 12, then share a secret common key, that they can be used to communicate at an immediate or a future point in time. Advantageously, after the completion of the second phase, the third-party providers do not need to be online or accessible in order for Alice and Bob to communicate in future. In some cases, future communication between Alice and Bob can comprise using an OTP approach with the shared key. In some cases, after communication, Alice and Bob can erase information used in previous phases of the protocol from their tables shared with the third-party providers. This can be referred to as a key erasure phase.

Figure 3:
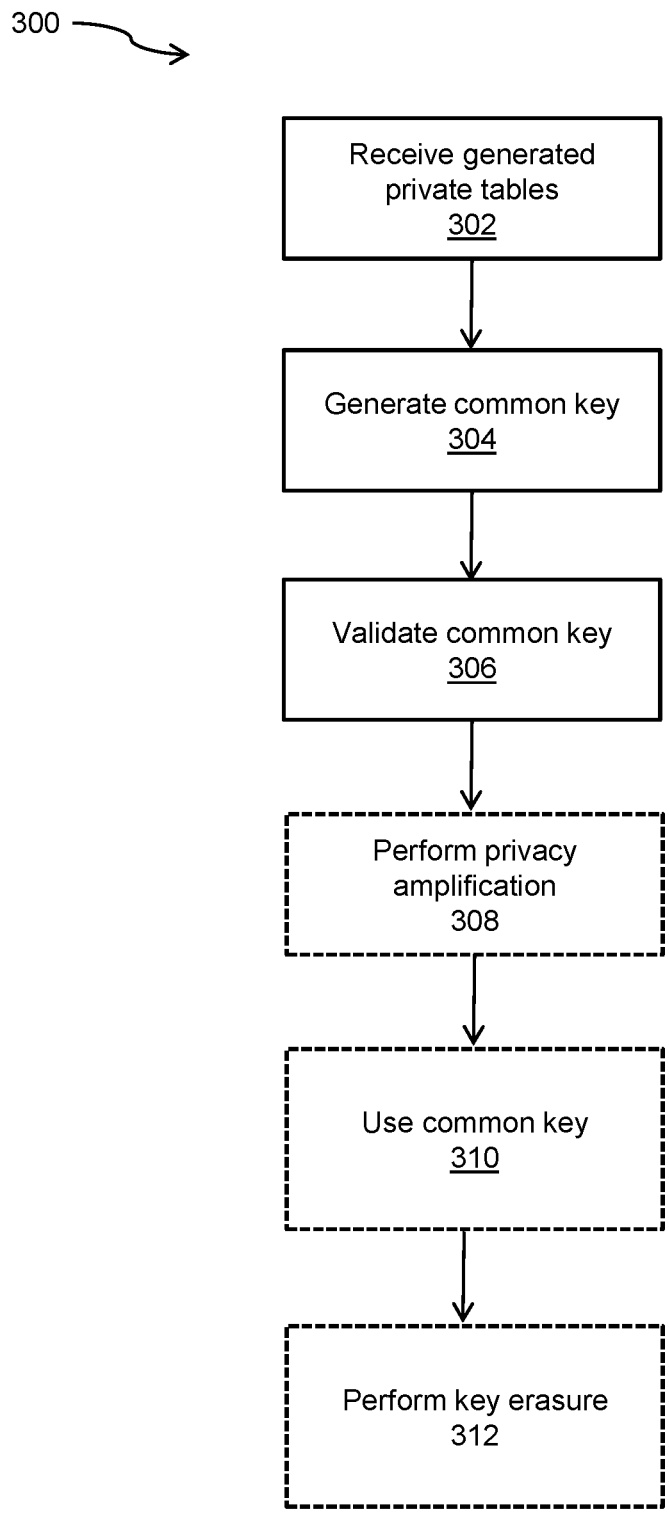
FIG. 3 is a flow chart for a method for key generation, according to an embodiment.

FIG. 3 is a flow diagram of a method 300 for key generation, according to an embodiment. It is understood that the common key can be generated for any suitable application, as described herein.

At block 302, for example as part of the key distribution phase, the table module 172 on both of the first user device (Alice) and the second user device (Bob) receives respective private tables of keys. Each private table is received from a respective one of the third-party providers and is unique for each pair of user and third-party provider. These private tables are distributed in a secure fashion. In some cases, each provider needs to maintain a number of tables at least equal to the number of users (or a subset thereof) and each user needs to maintain the number of tables equal to the number of third-party providers (or a subset thereof). In some cases, when the keys in a private table have all been used, a new private table needs to be received from the corresponding third-party providers. Accordingly, Alice receives table $K_1$ from third-party provider $P_1$, $K_2$ with third-party provider $P_2$, and so on. For clarity of illustration, these tables can be organized into a matrix K, with dimension $n \times l_A$ (where n is the number of third-party providers and $l_A$ is a very large number representing the size of each table), and with elements in $\{0; 1\}$. Matrix H is a matrix shared between Bob and the third-party providers; i.e., the first row $H_1$ (of length $l_S$, which is not necessarily equal to l) is shared between Bob and $P_1$, the second row $H_2$ between Bob and $P_2$, and so on. In an embodiment, table $K_i$ will have length $l_{A,i}$ and table $H_j$ will have length $l_{S,j}$. For simplicity of exposition, $l_{A,i} = l_{S,j} = l$ for each i and j and for some $l > 0$.

Figure 4:
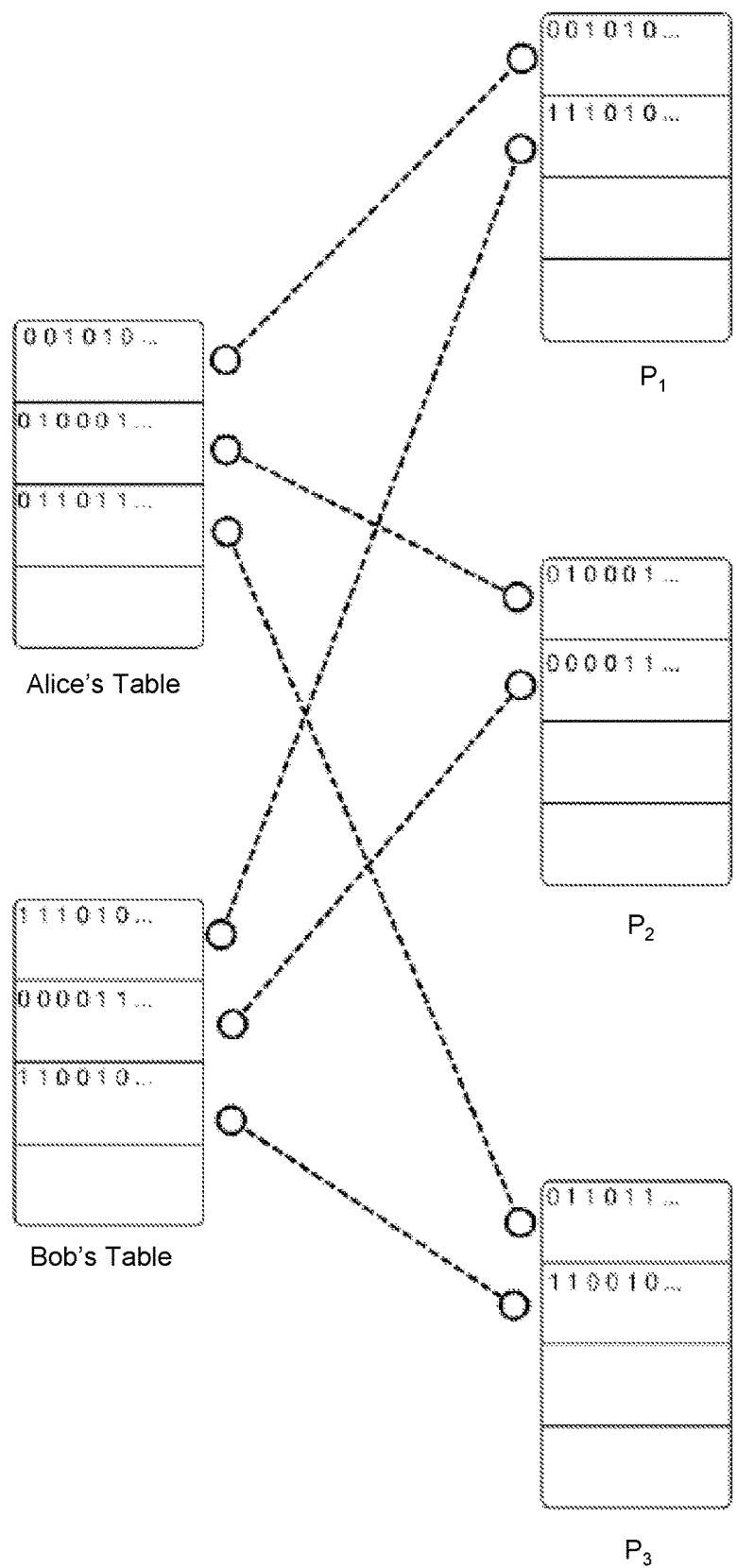
FIG. 4 is a diagram illustrating an example representation of results of generation and distribution of private tables, in accordance with the system of FIG. 2.

FIG. 4 illustrates a representation of an example of results of generation and distribution of the private tables. In this example, Alice and Bob share an ordered table of bits with each of the third-party providers, and each provider only knows their respective part of the users' table K and H.

In some cases, the private tables can be organized in memory in a matrix fashion. In an example, information in the first row of the table is shared only between the respective user and one of the third-party providers. In most cases, different users have different series of binary numbers shared with the same third-party provider. In this way, each user has a substantially different private table than other users; except for coincidentally similar entries. In some cases, the series of binary numbers can be indexed by integers, and these indexes can be used in the key agreement phase to construct a common key, as described herein. In this way, the common key will only be known by the respective users. In an embodiment, each third-party provider provides, to each of the private tables for each user, a subgroup of the binary numbers included in the private tables. In some cases, the binary numbers can be generated by a QRNG. For example, the first row of the private tables can be provided by a first third-party provider, a second row of the private tables can be provided by a second third-party provider, and so on. In some cases, the private tables can be generated by a pseudo RNG, a physical RNG, or a QRNG, and stored on a physical device and distributed to the users by a trusted agent. In some cases, the private tables may be stored in hardware security modules (HSMs).

In some cases, Alice and Bob can authenticate to each other and/or to the third-party providers. Any suitable authentication protocol can be used; for example, the Kerberos Network Authentication Service. In some cases, the authentication protocol can be assumed to be communicated over a secure connection. Advantageously, once the key agreement phase is completed, Alice 10 and Bob 12 can communicate any time in the future and their communication will remain secure; even when a future protocol can be found to break their previous authentication protocol.

For the key agreement phase, at block 304, the common key module 174 on both of the first user device (Alice) and the second user device (Bob), via communication with the third-party providers over the network interface 160, generates a common key. In this way, Alice and Bob, who may have never communicated before and likely do not share any initial information, use the support of the third-party providers to construct a common key k without directly communicating any key parameters to generate the common key. This common key is privately shared among Alice and Bob, and remains unknown to any of the third-party providers alone where more than one third-party provider is used.

In most cases, it can be assumed that the communication between Alice (and Bob) and the third-party providers for the key generation agreement can be performed over public channels. Indeed, as Alice (and Bob) already pre-share symmetric keys with any of the third-party providers, they can authenticate the channel at the beginning of the communication. For example, Alice (or Bob) can send a small number of bits to the third-party providers to prove her (or his) access to the shared entropy, and the third-party providers can reply with another small sequence of bits to confirm the access to the same shared entropy. Those sequences of bits can then be discarded and not used for any future purpose. All the subsequent communication between Alice (and Bob) does not reveal any information about the key generation process, and therefore can happen on any public channel.

In an embodiment, generation of the common key can include:

Alice generates n random indexing groups $X_i^A$. Each group $X_i^A$ is a collection of integers of size $m < l$.

Alice sends (for example, on public communication channels) each indexing group $X_i^A$ to a respective third-party provider $P_i$. An eavesdropper can listen to these communications as they only contain serial indexing numbers necessary to locate the value stored in the table, and there is no information obtainable about the value itself. This is because there is no correlation between indexes and the binary values associated with it.

Alice records the bits related to random indexes she generates. In this way, she builds a matrix $Y^A$ whom entries $Y_{ij}^A$ represent the bit in $K_i$, position $X_{ij}^A$ within that key table: $Y_{ij}^A = K_{i,X_{ij}^A}$. Further, Alice marks $K_{i,X_{ij}^A}$ as used.

Alice creates a common key $k_A$ by XOR the rows of $Y^A$. This key has length m.

Each third-party provider $P_i$ receives from Alice the respective set $X_i^A$ and marks the indexes in $K_i$, whom position is specified in $X_i^A$, as used.

Each third-party provider $P_i$ matches the bits specified by the indexes sent over by Alice into equivalent bits in $H_i$. By doing this, each third-party provider $P_i$ creates a set of random indexes $X_i^B$ that the third-party provider sends to Bob via, for example, the public channel. The indexes created by each third-party provider therefore has the property: $H_{i,X_{ij}^B} = K_{i,X_{ij}^A}$.

Bob receives the respective sets $X_i^B$ and builds up the matrix $Y^B$, where $Y_{ij}^B$ is $H_{i,X_{ij}^B}$. Furthermore, Bob marks all the bits in $H_i$ with indexes that appear in $X_i^B$ as used.

Bob creates a common key $k_B$ by XOR the rows of $Y^B$. This key has length m and is equal to Alice's common key $k_A$.

In another embodiment, generation of the common key can include:

Alice decides a certain quantity of bits she would like to share with Bob, referred to as m bits.

Alice determines the key values of her private table she would like to use. In some cases, Alice may use each row of her private tables in order of left to right. She keeps track of the location, r, of the first unused bit. (i.e., the r-th bit is the first unused bit in her list).

Alice broadcasts the values of r, m and the identity of Bob, to all third-party providers, in most cases, over public channels.

Each third-party provider $P_i$ relays the values of r, m and the identity of Alice to Bob.

Bob determines the key values of his private table he would like to use. In some cases, Bob may use each row of his private tables from left to right. He keeps track of the location, s, of the first unused bit.

Bob broadcasts the value of s to all third-party providers.

Each third-party provider, $P_i$, broadcasts, the value of $L_{(i,r+j,s+j)} = K_{(i,r+j)}$ XOR $H_{(i,s+j)}$, for j=0, 1, 2, ... m−1 as well as the identity of Alice and Bob, to the first user, Alice.

Alice confirms to each third-party provider, $P_i$, the receipt of the above communication.

Using the value of $K_{(i,r+j)}$ and the received value of $L_{(i,r+j,s+j)}$, Alice privately determines the parity bit $N_{(i,r+j,s+j)} = L_{(i,r+j,s+j)}$ XOR $K_{(i,r+j)}$ for each j=0, 1, 2, ..., m−1. Assuming $P_i$ is honest in executing the protocol, then $N_{(i,r+j,s+j)} = L_{(i,r+j,s+j)}$ XOR $K_{(i,r+j)} = K_{(i,r+j)}$ XOR $H_{(i,s+j)}$ XOR $K_{(i,r+j)} = H_{(i,s+j)}$. Thus, Alice and Bob now share component keys $H_{(i,s+j)}$ with each other. Note that, only the i-th third-party provider, $P_i$, Alice and Bob have the knowledge of $H_{(i,s+j)}$.

In some cases, Alice and Bob can use key authentication, as described herein, to verify that they share the same component keys $H_{(i,s+j)}$ with each other.

Each of Alice and Bob take the XOR of the component keys to generate a common key, referred to as $K_{AB}$ or $K_{common}$, whose j-th bit, $K_j = [\Sigma_{i=1}^n H_{(i,s+j)}] \mod 2$.

In some cases, as described herein, Alice and Bob can perform privacy amplification, PA, on the string K to distill a secure key $K_{common} = PA(K)$; which an eavesdropper does not have any information. In some cases, PA can be performed by applying a linear matrix; for example, a Toeplitz matrix, T.

In some cases, once Alice and Bob have confirmed to each other that they have successfully generated a common key $K_{common}$, they can direct each third-party provider, $P_i$, to erase the used key materials, $K_{(i,r+j)}$ and $H_{(i,s+j)}$, for j=0, 1, 2, ... m−1. In some cases, they can also direct the deletion of the fact that Alice is sharing a key with Bob. This can ensure that a future eavesdropper who breaks into the third-party provider, $P_i$, can no longer find the used key materials.

In some cases, Alice can erase her used key materials, $K_{(i,r+j)}$ for j=0, 1, 2, ... m−1. Similarly, Bob can erase his used key materials, $H_{(i,s+j)}$ for j=0, 1, 2, ... m−1.]

Alice updates the location of her first unused bit in her tables of key to r+m. Similarly, Bob updates the location of his first unused bit to s+m.

Note that, at the end of the key agreement phase, Alice and Bob share a common secure key $K_{common}$, which can be used either immediately or in future applications. For instance, it could be used for achieving information-theoretic security in communication via a one-time-pad approach in general-purpose communication channels; such as optical fiber, mobile phone, or Internet.

While the above embodiments describe certain communications and determinations, other suitable variants can be used. In the above embodiment, Alice uses the bits in her private tables of keys from left to right. In another embodiment, Alice may apply a random permutation before choosing each bit to use. More specifically, note that in case Alice wants to send m bits to Bob, she needs a key of length m; i.e. a series of purely random binary numbers of length m. To build this key, Alice can decide n series of indexes, one for each data provider, that she can re-map into binary numbers by looking up their values in her table.

In an example, Alice can pick number 34, 45 and 104 for the first third-party providers. Then she can look into the first row of the table (in an example, the row shared only with the first third-party provider) and look at the values in positions 34, 45 and 104. Suppose she finds 1, 1, 0. She does not share the binary values with anyone, but instead she shares the values 34, 45 and 104 with the first third-party provider. The first third-party provider receives the numbers 34, 45 and 104, and he can reconstruct the same series (1, 1, 0) as Alice. Alice can repeat these steps with multiple third-party providers. This way she will have n series of binary numbers (the first being 1, 1, 0); with every series being shared with only one third-party provider. Anyone could listen to the conversation between Alice and the provider without getting any information regarding the binary values themselves. For example, anyone who listens to 34, 45, 104 has no information at all about the series (1, 1, 0), as the information on the table is only available to Alice and the respective third-party provider. Alice can XOR all the n series of length m (in the example here m is equal to 3), and she can obtain another series of length m, which only she knows. To rebuild this series, an interloper would need all the series entering in the XOR operation. Therefore, the third-party providers would need to all cooperate in order to rebuild the series; which is highly unlikely. The resultant series from the XOR operation is the secret common key that can be used by Bob and Alice for communication; for example, using OTP.

In the above example, for Bob to arrive at the common key, each third-party provider can communicate the associated series to Bob. In this example, the first third-party provider communicates the series 1, 1, 0 (i.e., the first series of binary numbers used by Alice to rebuild the secret key)

to Bob. To communicate the series (1, 1, 0) to Bob, the first third-party provider can pick three indexes from the table shared with Bob that remap into (1, 1, 0), in some cases, the indexes can be randomly chosen as long as they remap to (1, 1, 0). For example, suppose that in the first row of the table of Bob, in this example, the series of binary numbers shared with the first third-party provider, at position 78, 98, 132 there are the binary numbers 1, 1, 0 respectively. The first third-party provider communicates 78, 98, 132 to Bob. An eavesdropper listening to this conversation will not be able to rebuild any further information. Bob, however, once received the ordered set of indexes from the third-party provider (i.e. 78, 98, 132), can re-build the series 1, 1, 0 by looking up the binary numbers in the respective row of his private table; thus, looking up in the first row the positions specified by the first third-party provider. The above steps are repeated by all the third-party providers. Bob therefore arrives at having a matrix n×m, where n is the number of third-party providers, and m is the length of the secret k. Bob can XOR all the n series of length m to arrive at the common key $K_{common}$.

In another example, Alice can have a table with n rows (in this example, n is also the number of third-party providers) and a significantly large number of columns. For the purposes of this illustrative example, the number of columns is equal to 10 for simplicity. The first row can be: (1 0 0 1 1 0 1 0 0 1). This series of binary numbers is known only by Alice and the first third-party provider. In contrast, the first row of Bob's table can be: (0 0 0 1 1 0 1 1 0 1). This series of binary numbers is known only by Bob and the first third-party provider. Alice can send the series (2, 5, 1) to the first third-party provider; where the series is determined by Alice translating the positions indicated by the series, as indexes of the table, into binary numbers: (2, 5, 1)→(0, 1, 1). The first third-party provider can also perform such translation, such that only Alice and the first third-party provider know the binary series. The first third-party provider can then communicate the same series (0, 1, 1) to Bob. To do so, the first third-party provider can pick random indexes in the series shared with Bob, that re map into (0, 1, 1). In this example, any of (3, 4, 5), (9, 10, 8), or (6, 10, 8), or any other series of indexes that re map into (0, 1, 1), can be communicated to Bob. For example, if the first third-party provider sends (9, 10, 8) to Bob, Bob can look up these indexes in his private table to arrive at the same binary sequence as Alice (0, 1, 1). Alice and Bob can do the above steps with all the n third-party providers, such that they each will have n series of binary numbers. If they each apply an XOR operation on these series of numbers, they can construct a secret common key only they can re-build. These steps can be performed vice versa for communications from Bob to Alice. Suppose Eve, a malicious intruder, wants to rebuild the secret key. Even in the case where Eve listens to all the conversations between Alice and Bob and the third-party providers, it is impossible for her to rebuild the secret key as she has no way to convert each index into the re-mapped binary digit (in the example above, Eve cannot map (2, 5, 1) into (0, 1, 1)), as the binary numbers are generated randomly. Suppose now a third-party provider would like to rebuild the secret key. As each third-party provider only knows his part of the series using by Alice and Bob in the XOR operator, it is impossible to predict the final result of the XOR and therefore the key can remain secret.

Figure 5A:
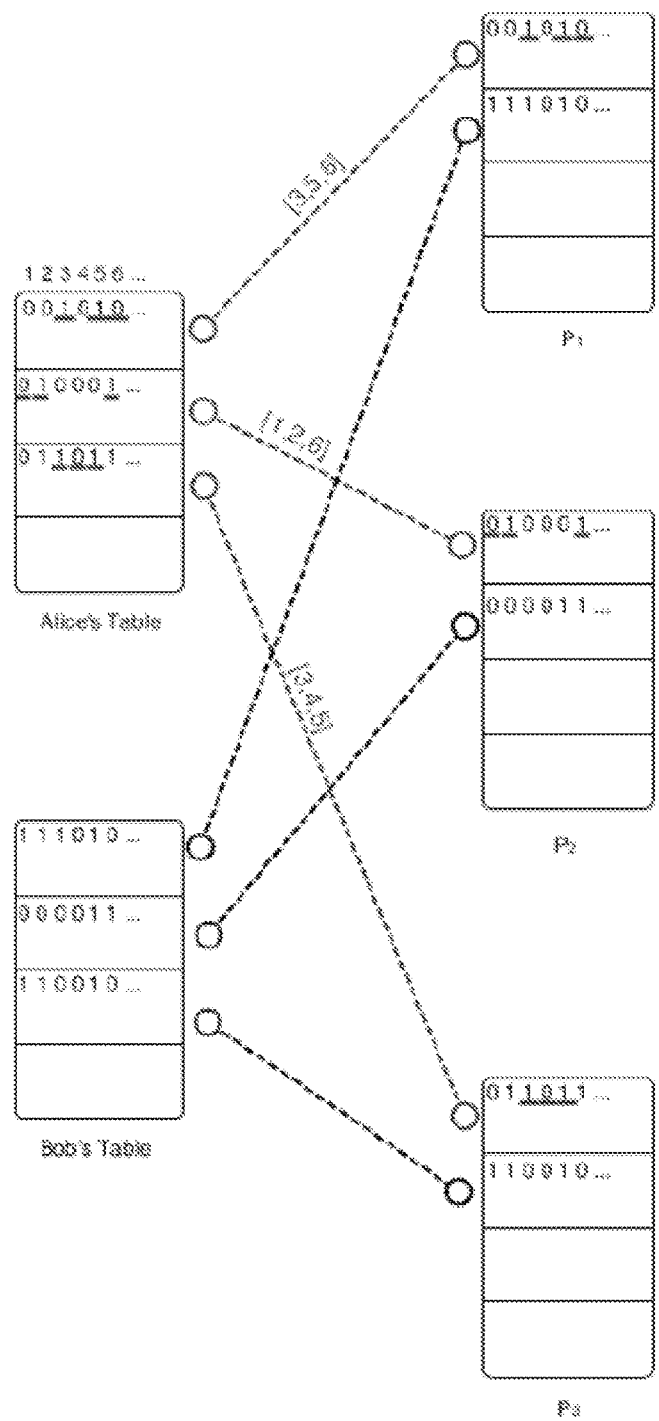
FIG. 5A is a diagram illustrating an example of key reconstruction for Alice, in accordance with the system of FIG. 2.
Figure 5B:
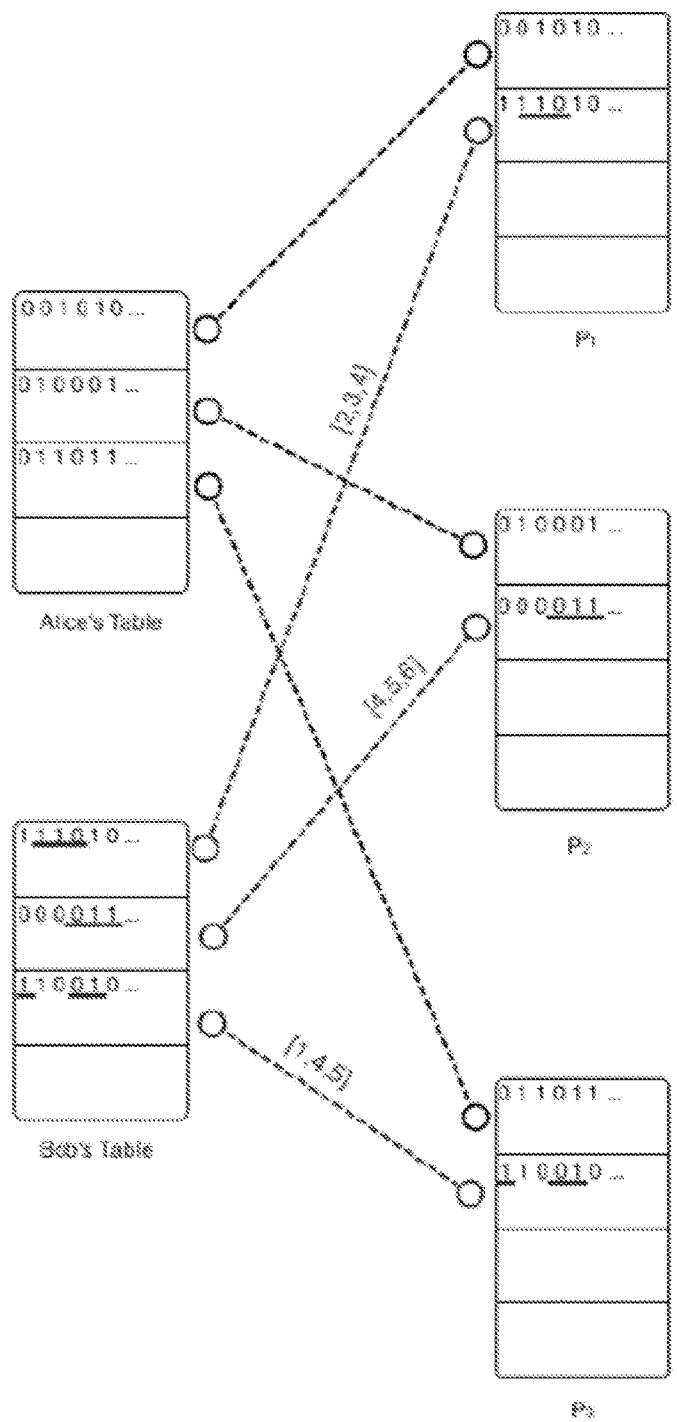
FIG. 5B is a diagram illustrating an example of key reconstruction for Bob, in accordance with the system of FIG. 2.

FIGS. 5A and 5B illustrate another illustrative example of key generation for Alice and Bob, respectively. Alice initiates an exchange with the three third-party providers $P_1$, $P_2$, $P_3$. The public messages from Alice to the three third-party providers are respectively [3, 5, 6], [1, 2, 6] and [3, 4, 5]. In this example, for n=3, $X_1^A$=[3, 5, 6], $X_2^A$=[1, 2, 6] and $X_3^A$=[3, 4, 5]. These sets of serial numbers are associated, within the respective tables, with key values [1, 1, 0], [0, 1, 1], [1, 0, 1]. The third-party providers then generate the serial numbers for Bob such that the serial numbers are a set of indexes that reproduce the same key values in Bob's tables. Among the many possibilities, the one sent by the third-party providers in the figure are [2, 3, 4], [4, 5, 6] and [1, 4, 5]. In this example, for n=3, $X_1^B$=[2, 3, 4], $X_2^B$=[4, 5, 6] and $X_3^B$=[1, 4, 5]. At the end of this phase, all the bits employed in the communication are marked as used such that the bits will not be used again.

Advantageously, the approach of the present embodiment is independent on the type of communication; accordingly, it can be used for video calls, voice calls, emails, messages, and any sort of data Alice wishes to send to Bob. Also advantageously, it is not necessary that Alice knows in advance the amount of bits to be transmitted to Bob, as this amount can be adjusted during runtime.

In another embodiment, RNG at the user level may not be required by letting each third-party provider $P_i$ select the key to be used for the encryption. In this way, when Alice starts a communication with Bob, both parties immediately receive a set of indexes that can be locally mapped into the same binary string; the indexes are different for Alice and Bob for the same data third-party provider. The different strings obtained by the different third-party providers are combined as described herein into a common key that will be equal for Alice and Bob. In this embodiment, generation of the common key can include:

Alice decides a certain quantity of bits she wants to communicate to Bob. If Alice needs to send m bits, Alice sends this information (the number of bits m and the receiver Bob) to each third-party provider $P_i$.

Each third-party provider $P_i$ generates a random binary string $s_i \in \{0; 1\}^m$ of length m, for example using a QRNG. Each third-party provider matches m indexes in the table $K_i$ (shared with Alice) which (i) has never been used and (ii) remaps exactly to $s_i$. This set of indexes can be referred to as $k_i$. In the same way, each third-party provider can generate a set of indexes, $h_i$, for Bob. Each third-party provider marks as used the indexes used for this communication round.

Each third-party provider communicates, via public channel, $k_i$ to Alice and $h_i$ to Bob. Advantageously, as these indexes contain serial numbers to reconstruct the keys, they have no information about the real key; thus, eavesdroppers can listen to this exchange without gaining useful information.

Alice creates a matrix $Y^A$ by matching the indexes sent by each third-party provider to the shared tables. $Y^A$ is a matrix with n rows and m columns, where element $Y_{ij}^A$ is equal to $K_{i,k_{ij}}$.

Alice generates a common key $k_A$ by XOR the rows of $Y^A$; where the key has length M.

Alice marks as used the indexes used in this communication round.

Bob creates a matrix $Y^B$ by matching the indexes sent by each third-party provider to the shared tables. $Y^B$ is a matrix with n rows and m columns, where element $Y_{ij}^B$ is equal to $H_{i,h_{ij}}$.

Bob generates a common key $k_B$ by XOR the rows of $Y^B$; where the key has length M.

Bob marks as used the indexes used in this communication round.

In another embodiment, RNG at the user level may not be required by letting each third-party provider $P_i$ select a key to be used for encryption. In this way, when Alice needs to rebuild a secret key shared with Bob, Bob immediately receives a set of values from each third-party provider that can be used to generate the secret key. In this embodiment, generation of the common key can include:

Alice decides a certain quantity of bits she wants to communicate to Bob. If Alice needs to send m bits, Alice sends this information (the number of bits m and the receiver Bob) to each third-party provider $P_i$.

For each of her table $K_i$ (shared with third-party provider $P_i$) Alice considers the first m unused bits. Suppose the last used bit in table $K_i$ is at index j, then Alice considers the series of bits: ($Y^A_i = K_{ij+1}, K_{ij+2}, \ldots, K_{ij+m}$). Alice marks those bits as used. Alice builds a matrix $Y^A$ where the $i^{th}$ row is $Y^A_i$.

Each third-party provider $P_i$ computes the series of bits $N_i = (K_{ij+1}$ xor $H_{i,s+1}, K_{ij+2}$ xor $H_{i,s+2}, \ldots, K_{ij+m}$ xor $H_{i,s+m})$, where j was the last used bit in table $K_i$ and s was the last used bit in table $H_i$. Each third-party provider $P_i$ marks the bits used to construct $N_i$ as used.

Each third-party provider communicates, via public channel, $N_i$ to Bob. Advantageously, as these indexes contain the exclusive or operator on series on random bits, they have no information about the real key; thus, eavesdroppers can listen to this exchange without gaining useful information.

Bob creates a matrix $Y^B$ where the $i^{th}$ row is the series: $Y^B_i = (N_{i,1}$ xor $H_{i,s+1}, N_{i,2}$ xor $H_{i,s+2}, \ldots, N_{i,m}$ xor $H_{i,s+m}) = Y^A_i$. Bob marks all the bits employed to build $Y^B$ as used.

Alice generates a common key $k_A$ by XOR the rows of $Y^A$; where the key has length m.

Bob generates a common key $k_B$ by XOR the rows of $Y^B$; where the key has length m.

The above embodiments for generating the common keys is much less computational and/or resource intensive for the user devices as it does not require random number generation (especially QRNG) at the user level; and it involves the same number of bits exchanged over the network.

Alice and Bob both have a key, $k_A$ and $k_B$ respectively, that can be used for encrypted communication with each other. In some cases, at block 306, before using the common keys for communication, the authentication module 176 on both of the first user device (Alice) and the second user device (Bob) can validate the authenticity of the keys; i.e., verify that $k_A = k_B$. Any suitable approach for key verification can be used. In an example approach, Alice and Bob can authenticate the final keys $k_A$ and $k_B$. In this example approach:

Alice uses a hash-function H to compute $s_A = H(k_A)$; where $s_A$ is a binary string of length L. The choice of the hash function may be application specific, as the requirement in terms of costs and security of this function may very considerably depending on the context of use. An example can be using the SHS-256 hash function. Another example can be a set of two-universal hash functions such as the Toeplitz matrix T.

Alice broadcasts a certain number of pairs (j; $s_{A,j}$), with $j \in 1, 2, \ldots, L$.

Bob uses the same hash-function H to compute $s_B = H(k_B)$; where $s_B$ is a binary string of length L.

Bob collects the pairs (j; $S_{A,j}$) broadcasted by A, and determines whether $s_{A,j} = s_{B,j}$, for all the pairs communicated by Alice.

In another example approach to key validation, the validation of the key can be performed over each of the key components $Y^A_i$ and $Y^B_i$, for $i = 1, 2, \ldots, m$. While this approach generally involves more bits to be exchanged between Alice and Bob, and hence higher communication costs, it allows the users to identify and exclude third-party providers potentially performing a denial of service attack. In this example approach:

Alice uses an hash-function H to compute $s_{i,A} = H(Y^A_i)$; where $s_{i,A}$ is a binary string of length L, and $Y^A_i$ represents the bit in $K_i$, position $X^A_i$ within a key group.

Alice sends the pair {i; $s_{i,A}$} to Bob.

Bob uses the same hash-function H to compute $s_{i,B} = H(Y^B_i)$; where $s_{i,B}$ is a binary string of length L, and $Y^B_i$ is equal to $H_{i,X^B_i}$.

Bob collects the pair {i; $s_{i,A}$} broadcasted by Alice, and determines whether $s_{i,A} = s_{i,B}$. Bob communicates this result to Alice.

The above steps are repeated for each i. In the end, Alice and Bob have a shared list of indexes in $\{1, 2, \ldots, m\}$ that passed the test of whether $s_{i,A} = s_{i,B}$.

Alice and Bob use the common set of indexes to rebuild their key $k_A$ and $k_B$ by the XOR operation performed on $Y^A$ and $Y^B$, respectively, on the rows which passed the test.

In the above approaches to key validation, some information about the key k may be disclosed. In the first approach, there is a trade off between having a large L, where more and more information gets disclosed but the authenticity of the key becomes more reliable, and having a small L, where less information gets disclosed but the authenticity of the key is less certain. In the second approach, a substantial advantage is the ability of Alice and Bob to identify third-party providers running DoS attack. In another approach, Alice and Bob can check randomly some of the bits of $k_A$ and $k_B$ until the probability that $k_A \neq k_B$ is smaller than an acceptable threshold.

In some cases, at block 308, the amplification module 178 on both of the first user device (Alice) and the second user device (Bob) can perform privacy amplification. During key validation, Alice and Bob may have needed to release some information about the keys that Eve may have accumulated in an attempt to rebuild the key. Among a set of two universal hash functions, to arbitrarily reduce the amount of information possessed by Eve, Alice and Bob can publicly choose a function g: $\{0, 1\}^m \to \{0, 1\}^r$, with r<m, and build up a new revised key k=g(k). The resulting revised k can be generally uniformly distributed given all information in possession of Eve; and can thus be safely used. The size r of the new revised key, as well as the choice of the function g, can depend on the amount of information Eve could have obtained during key validation; which in turn depends on the Hash function used for their key validation test. As the Hash function is application specific, the choice of both H and g can depend on specific usages.

At block 310, the communication module 180 can use the common key for suitable applications, as described herein. In some cases of secure communication, the communication module 180 on both of the first user device (Alice) and the second user device (Bob) can communicate, via each respective network interface 160, using the shared key, $k = k_A = k_B$. In some cases, the communication can use an OTP approach:

Alice uses k in a one-time pad scheme to encrypt her initial message msg: ctx=OTP(msg; k); where ctx represents the encrypted message, msg the original message, and OTP the One-Time Pad scheme, used with key k.

Alice sends the message to Bob over a public communication channel.

Bob decrypts the message: msg=OTP$^{-1}$(ctx; k).

The above OTP approach applies vice versa with Bob's encrypted messages sent to Alice.

In some cases, at block 312, the erasure module 182 on both of the first user device (Alice) and the second user device (Bob) can perform key erasure to ensure security even in the eventuality that any of the tables are stolen from either user. In an example, both parties can flip all the used bits with probability 0.5; i.e., for each bit that has been marked as used, a 0.5 probability is evaluated for whether the respective bit x will be flipped into 1−x. This evaluation ensures that, even if the device is lost, previous communications cannot be decrypted. In this way, even if the device gets stolen, there is still no way to rebuild the original data, even if such data is stored in a cloud computing environment. In some cases, the third-party providers can also erase their keys. In these cases, there is definitively no way of recovery of the information transmitted. In another case, consider the case where Alice is a user who wants to store information on one or more servers and access it at a later stage; or even grant the access to Bob. The information can be a key, and can also be the data itself; this information can be stored within the providers in a fashion described herein. The third-party providers, by maintaining the information intact, allow for the data to be rebuilt in a future time, by Alice or by any other authorized user who shares key tables with the third-party providers.

In an example for encrypted phone calls, for each m bits of message sent, further nm bits must be sent (where n is the number of third-party providers), plus a certain (negligible) number of bits for authenticating (for example, Alice can send f bits to party $P_i$, taken as the first f unused bits in $K_i$, to authenticate). Therefore, to initiate a 2-minute call (roughly 1.2 MB on VOiP protocol), the amount of data to be exchanged in advance between Alice and the third-party providers is roughly 3.6 MB (assuming n=3); this requires (assuming the QRNG always keeps updated a small register with new random numbers) roughly 0.04 s for reading the data from the memory, plus the time required for sending the data to the providers. The third-party providers need to match the key and send over the same amount of data to Bob. Assuming Bob has the same speed in reading data from his registers (90 MBs), it will be approximately a 0.3 s latency time to initiate the 2-minute call. This latency is commercially reasonable considering the added value of the encryption.

In some cases of the method 300, the randomness can be assumed to arrive from an RNG (e.g., QRNG) located on the user's device. In other cases, a large number of random numbers (e.g., quantum random numbers) can be pre-installed on the user's device. In these cases, for example, the user devices may be replaced whenever the keys have been completely used; such as via a subscription service. In further cases, the quantum random numbers can be pre-installed and stored on a separate memory storage device that is in communication with the user's device; whereby the memory storage device can be replaced when the pre-installed numbers have been completely used.

Generally, third-party providers and the communication system between the devices are likely the weakest portions of the protocol. In some cases, legal enforcement can be used to ensure compliance by the third-party providers consisting of having the third-party providers sign a contract. This contract can legally force them to reimburse final users in case of data (key) leaks where they are liable. While, even with legal contracts, third-party providers may still engage in unwanted activities, the probability that all of the third-party providers engage in those activities can be considered as negligible. Particularly, the probability of all cooperating is significantly low where the third-party providers are diverse; for example, diverse in interests, background, geographic location, and the like. In some cases, the role of third-party providers can be provided, at least in part, to national authorities. In some cases, a further layer of cryptography can be used; for example, at least AES-128 can be used. This further layer of security may be implemented on the user devices.

In some cases, for large enough organizations, assuming the devices are used to only communicate among each other within the same organization, the organization itself can also act as the third-party providers and manage production and distribution of the keys.

In some cases, the third-party providers can be authenticated such that a DoS attack by any third-party provider can be immediately identified. The third-party provider can then be expelled and removed from their role. In some cases, third-party providers can receive compensation for their role, a DoS attack would be disincentivized as a permanent loss of income.

Advantageously, it is impossible for each single third-party provider to reconstruct the encryption key without collaborating with all other third-party providers. This implies, that as long as at least one of the third-party providers is honest, the key cannot be reconstructed: a key-reconstruction (KR) attack is impossible. In some cases, a single dishonest third-party provider can perform a Denial of Service (DoS) attack by providing wrong data to Alice and/or Bob during the exchange phase of the protocol. The following provides common key generation at block 304, according to another embodiment. In this embodiment, components are provided to avoid potential DoS attacks.

In this embodiment, to generate the key that Alice and Bob need to use to communicate, using for example OTP, Alice generates n random points on a Cartesian plane that she distributes to the n third-party providers $P_1, P_2, \ldots, P_n$ using the shared keys between Alice and the third-party providers. The n points generates by Alice lay on a polynomial of degree g, where 1≤g≤n−1. The intersection between the polynomial and the y-axis of the Cartesian plane uniquely identifies the key that will be used in communication between Alice and Bob. The third-party providers, using the table shared with Bob, deliver the n points to him, which can be used to rebuild the polynomial and therefore the common key.

The degree g of the polynomial affects the security of the protocol; such that:

When g is overly small, for example g=1, it may be easy for a small number of third-party providers to cluster and perform KR attacks, as few points are enough to rebuild the polynomial. At the same time, when g is so small, it is very hard to conduct a DoS attack, as many third-party providers have clusters to stop Bob from reconstructing the key.

When g is overly large, a larger number of corrupted providers is likely necessary to conduct a KR attack, but a smaller number of third-party providers are enough to conduct a DoS attack. For example, when g=n−1, the previously described approach for performing block 304 should be used.

In view of the above trade-off, determining a value for g depends on the number of providers n, on a probability of them being dishonest, on the cost of a KR attack (for example, high for mobile communication and data storage applications) versus the cost of a DoS attack (for example, high for data storage), and on the cost of having a large number of third-party providers.

In this embodiment, there are the two users, Alice and Bob, and the set of n providers $P_1, P_2, \ldots, P_n$ sharing a set of private keys with Alice and Bob. In particular, $K_i$ is the set of bits of length l privately shared between Alice and $P_i$, so that the bit $K_{ij} \in \{0; 1\}$ represents the value of the jth bit in the set shared between Alice and $P_i$. In the same way, $H_i$ is the set of keys shared between Bob and $P_i$. Consider the situation where Alice would like to construct a shared key with Bob that can be used for communication or any other application requiring a key; for example, using OTP encryption. Alice can use a secret sharing protocol (for example, Shamir's Secret Sharing protocol) to build such a key and share it with Bob. For the purposes of illustration, the key can be considered a number k; where in further cases the key can be described in terms of binary bits. In this embodiment, a particular secret sharing protocol is used as an example, however any suitable secret sharing protocol can be used. In this embodiment, an example approach of common key generation can include:

Alice generates a g-degree polynomial that intersects the y-axis on the Cartesian plane in k, where g is an integer and $g \in [1; n-1]$. Where $f_A$ is a polynomial such that $f_A(0)$ equals the common key $k_A$.

Alice selects exactly n random points on the generated polynomial. The random points are $a_1 = \{x_1; f_A(x_1)\}$, $a_2 = \{x_2; f_A(x_2)\}, \ldots, a_n$, where $x_i \neq 0$, $\forall i$.

For each point $a_i$, Alice prepares a series of indexes $[k_{i,1}, k_{i,2}, \ldots, k_{i,t}]$, never used before in communication between Alice and $P_i$, and such that $K_{ik_{i,1}}, K_{ik_{i,2}}, \ldots, K_{ik_{i,t}}$ uniquely identify $a_i$ on the Cartesian plane. In some cases, the length of $k_i$ can be the amount of bits necessary to identify one point (i.e. two coordinates) on the Cartesian plane.

Alice sends the ith series $[k_{i,1}, k_{i,2}, \ldots, k_{i,t}]$ to provider $P_i$, over a public channel.

Alice denotes the indexes used from each table $K_i$ as 'used'.

Alice sends the number g to Bob.

Each third-party provider $P_i$ prepares a series of indexes $[h_{i,1}, h_{i,2}, \ldots, h_{i,t}]$, never used before in communication between Bob and $P_i$, and such that $H_{ih_{i,1}}, H_{ih_{i,2}}, \ldots, H_{ih_{i,t}}$ uniquely identify $a_i$ on the Cartesian plane.

$P_i$ sends the series $[h_{i,1}, h_{i,2}, \ldots, h_{i,t}]$ to Bob, over a public channel.

Bob receives the series from the third-party providers, and generates the points $a_1 = \{x_1; f_A(x_1)\}$, $a_2 = \{x_2; f_A(x_2)\}, \ldots, a_n$. Bob measures the intersection point of the curve with the y-axis, which forms the common key $k_B$.

Note that when g=1, the above approach is information-theoretically equivalent to the previously described approach.

To determine an approximately optimal g, the following can be considered:

Given n third-party providers, and a g-degree polynomial, to conduct a Key Reconstruction attack at least g+1 dishonest third-party providers are required. The probability for a provider to not follow the protocol can be considered to be equal to q, and the probabilities can be considered uncorrelated. Then the final probability for a KR attack is:

$$Pr^{KR}(g; n; q) = \sum_{k=g+1}^{n} \binom{n}{k} q^k.$$

Given n third-party providers, and a g-degree polynomial, at least n−g dishonest providers are required to conduct a Denial of Services attack. The probability for a provider to not follow the protocol can be considered to be equal to q, and the probabilities can be considered uncorrelated. Then the final probability for a DoS attack is:

$$Pr^{DoS}(g; n; q) = \sum_{k=n-g}^{n} \binom{n}{k} q^k.$$

Figure 6:
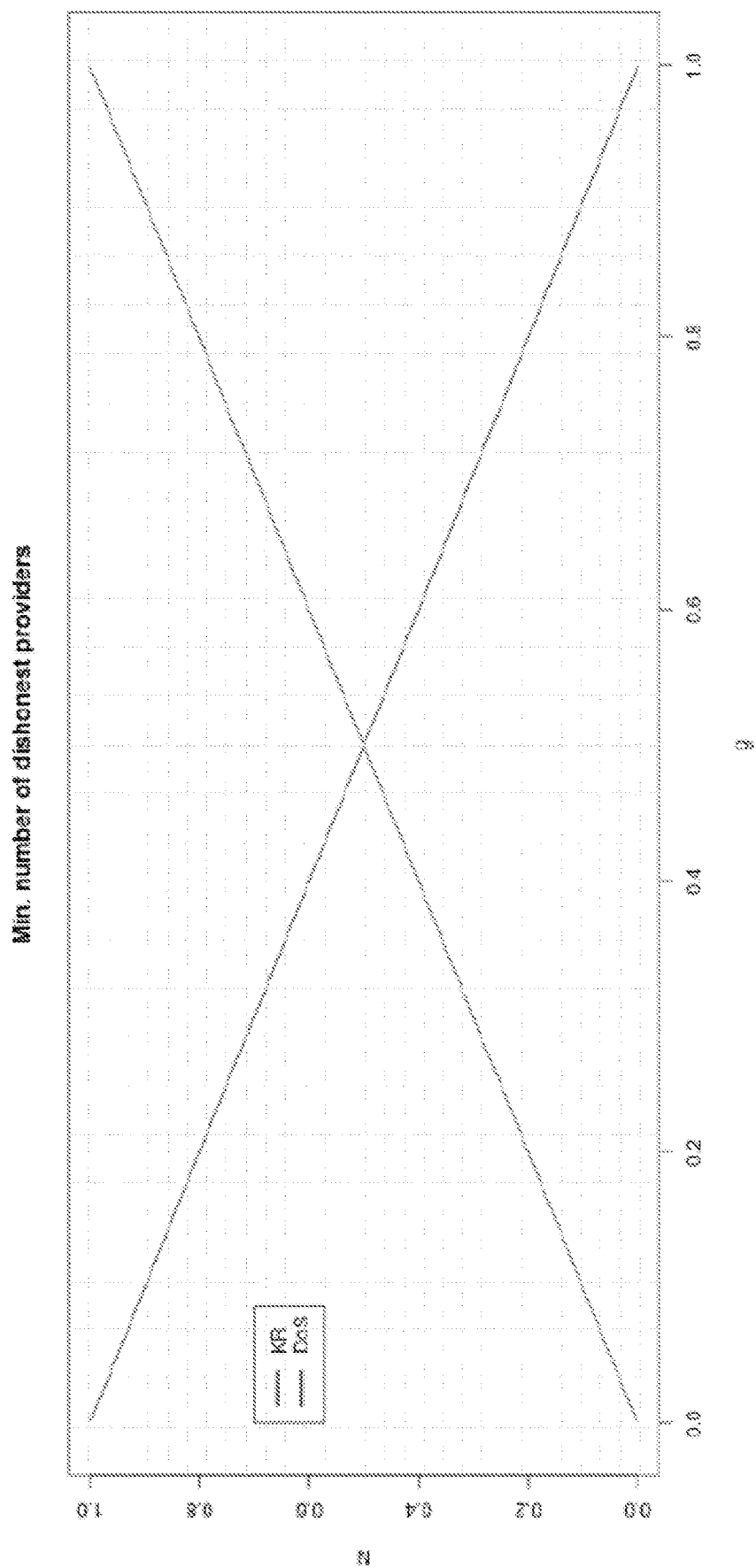
FIG. 6 illustrates a plot of an example of a minimum fraction of dishonest providers normalized by total number of providers, in accordance with the system of FIG. 2.

In the worst-case scenario, a dishonest third-party provider tries to engage in both KR attacks and DoS attacks at the same time. FIG. 6 illustrates a plot of an example of a minimum fraction of dishonest providers as a function of g normalized by the total number of providers n. On the vertical axis, there is the minimum fraction of providers that must be dishonest to conduct the attack, as a function of polynomial degree g; where both quantities are divided by n. Taking the minimum of the two curves gives, for every point g, the minimum fraction of dishonest players necessary to conduct at least one of the two attacks. It is clear from the plot that values of g equal to n/2 provides the safer configuration, although the different attacks may have different costs for the final users, and therefore the optimal g can be moved more to the left or to the right. For example, for mobile communication, a KR attack may be way more costly than a DoS attack, and therefore the optimal g would be closer to n.

The actual probability to have an attack as a function of g can be determined by calling q the probability for a provider to be corrupted, and by assuming no correlation among these probabilities. The total probability to have an attack is equal to:

$$Pr^{TOT}(g; n; q) = \begin{cases} Pr^{KR}(g; n; q), & g \leq n/2 \\ Pr^{DoS}(g; n; q), & g > n/2 \end{cases}$$

Figure 7:
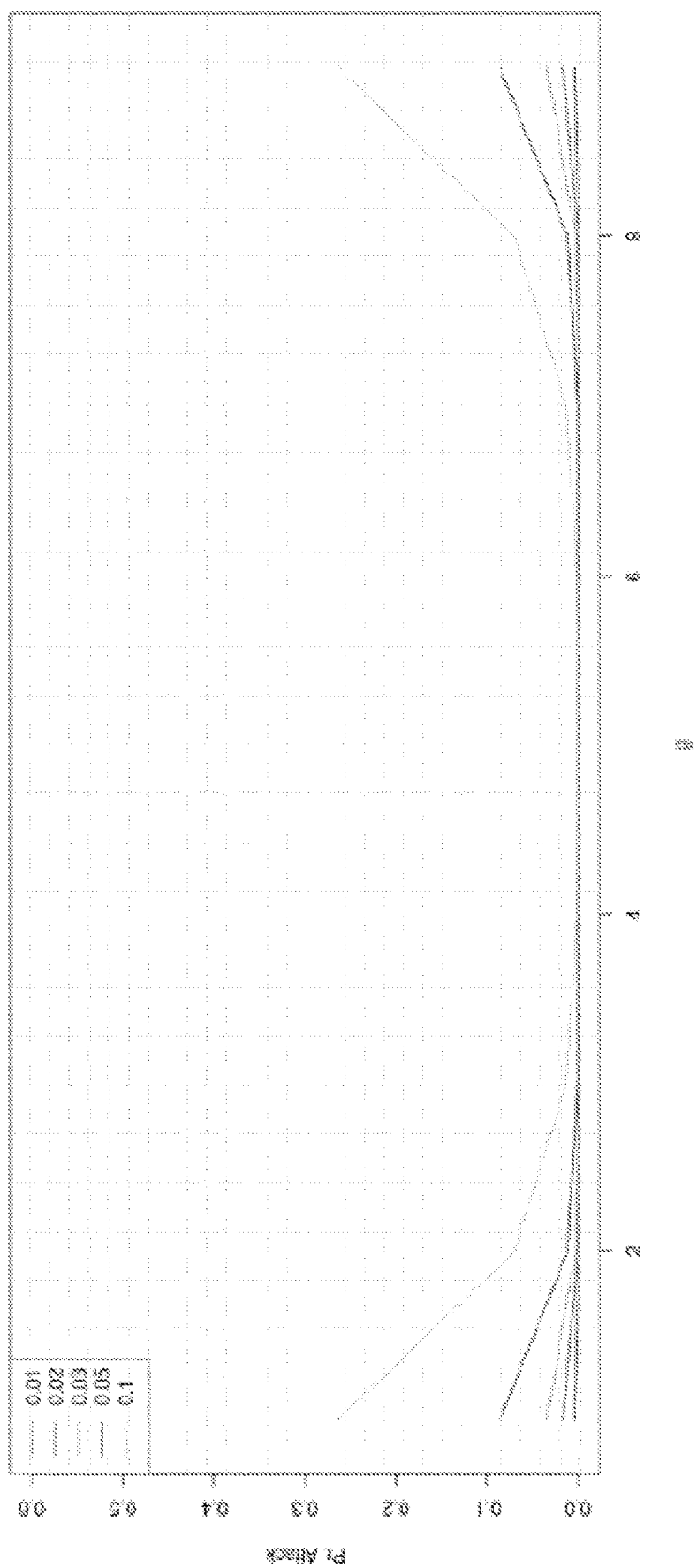
FIG. 7 illustrates a plot of an example of probabilities of an attack for five different scenarios, in accordance with the system of FIG. 2.

Consider an example where n=10, and different values for the qs are used; in particular, $q_1=0.01$, $q_2=0.02$, $q_3=0.03$, $q_4=0.05$, $q_5=0.1$. FIG. 7 illustrates a plot of an example of the probabilities of an attack for the five different scenarios $q_1$ to $q_5$. On the vertical axis, there is the probability to have an attack, for the case n=10, as a function of g. In the optimal case g=4, the following probabilities for an attack are: $p_1=10^{-10}$ (for scenario $q_1$), $p_2=10^{-8}$, $p_3=10^{-7}$, $p_4=10^{-6}$, and $p_5=10^{-4}$. In particular, even in an adverse scenario where the probability to have a corrupted provider is in the order of 0.2, the final gain on the probability of an attack amounts to three order of magnitude (going from 0.1 to 0.0001). Accordingly, this risk is well within what would be considered practically commercially reasonable.

Figure 8:
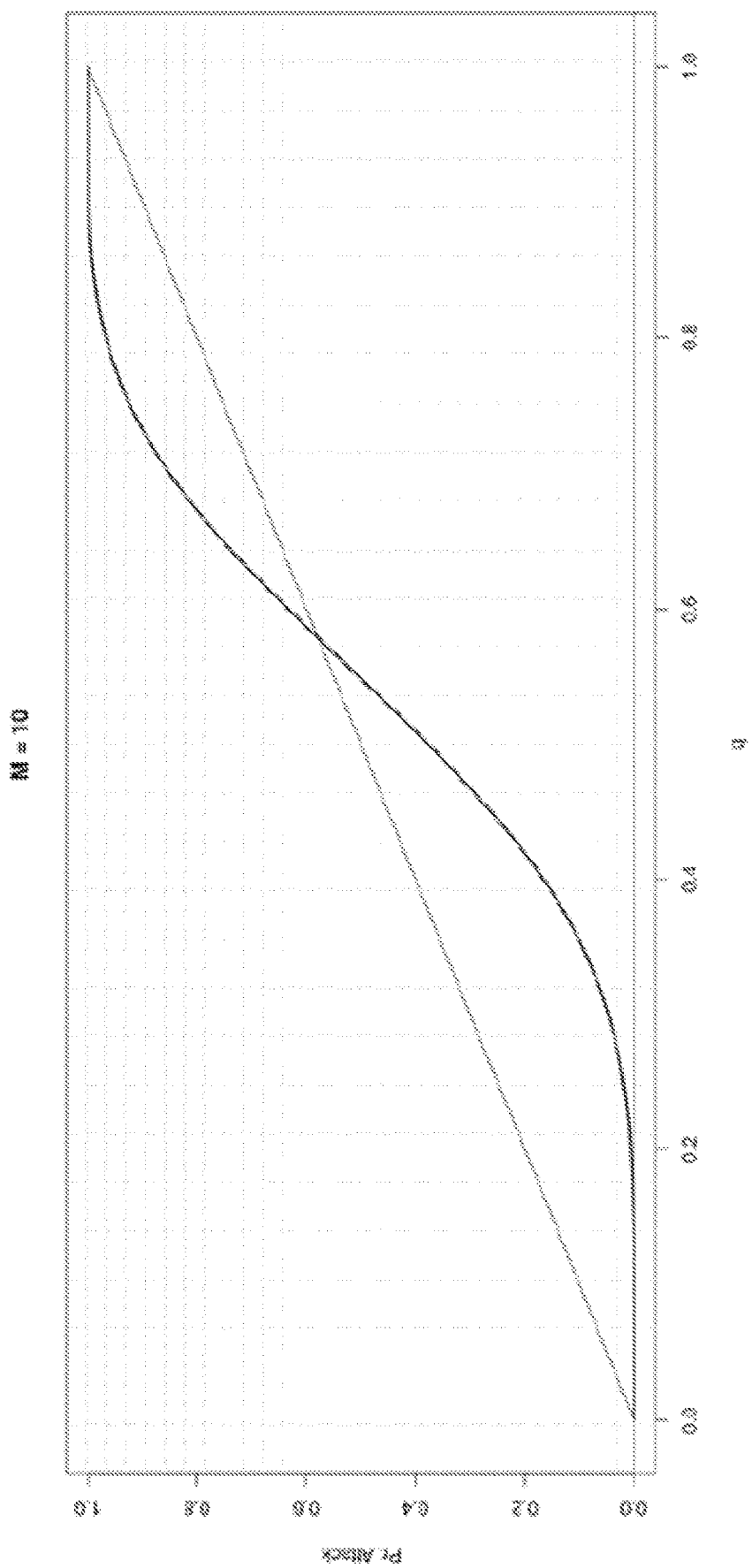
FIG. 8 illustrates a plot showing a probability to have an attack, for a case of ten third-party providers, as a function of a probability that a third-party provider fails, in accordance with the system of FIG. 2.
Figure 9:
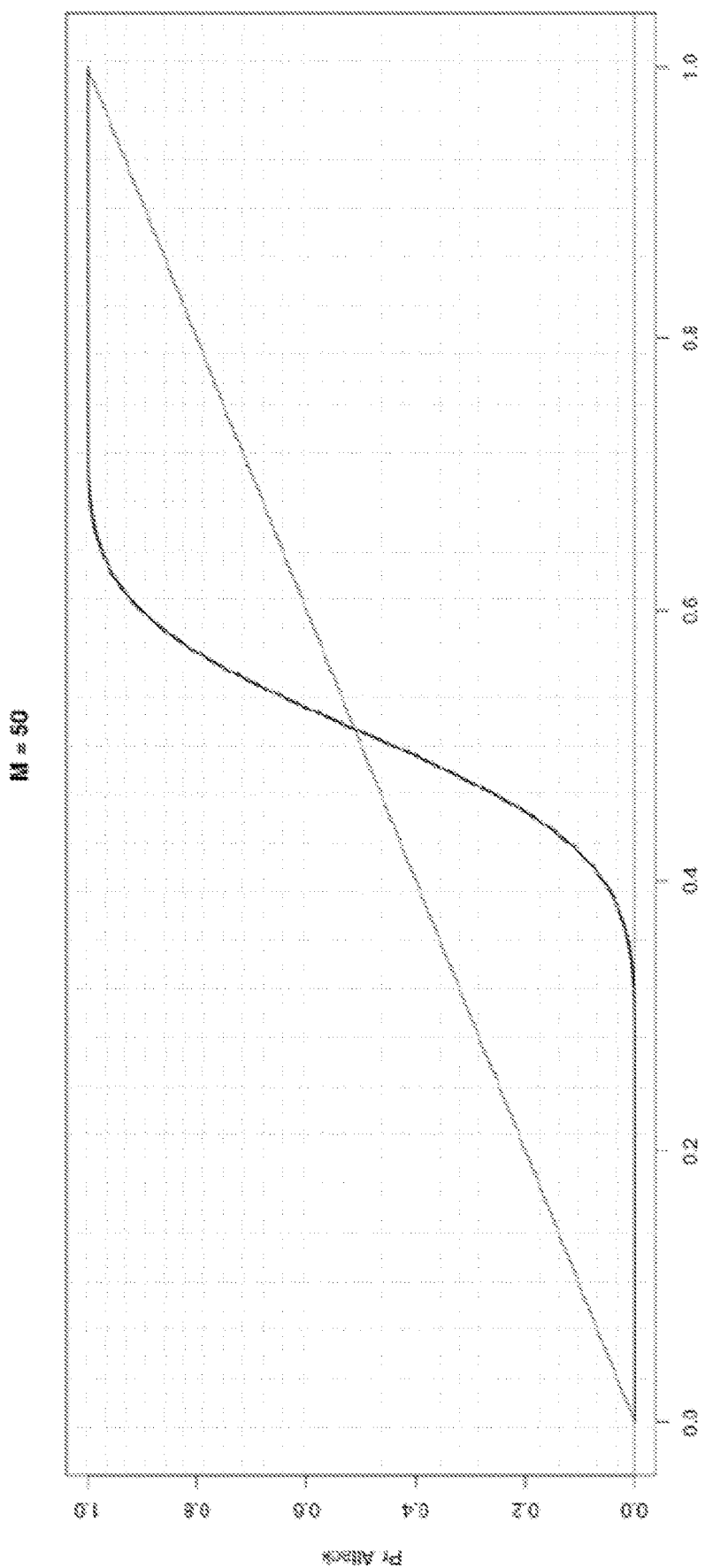
FIG. 9 illustrates a plot showing a probability to have an attack, for a case of fifty third-party providers, as a function of a probability that a third-party provider fails, in accordance with the system of FIG. 2.
Figure 10:
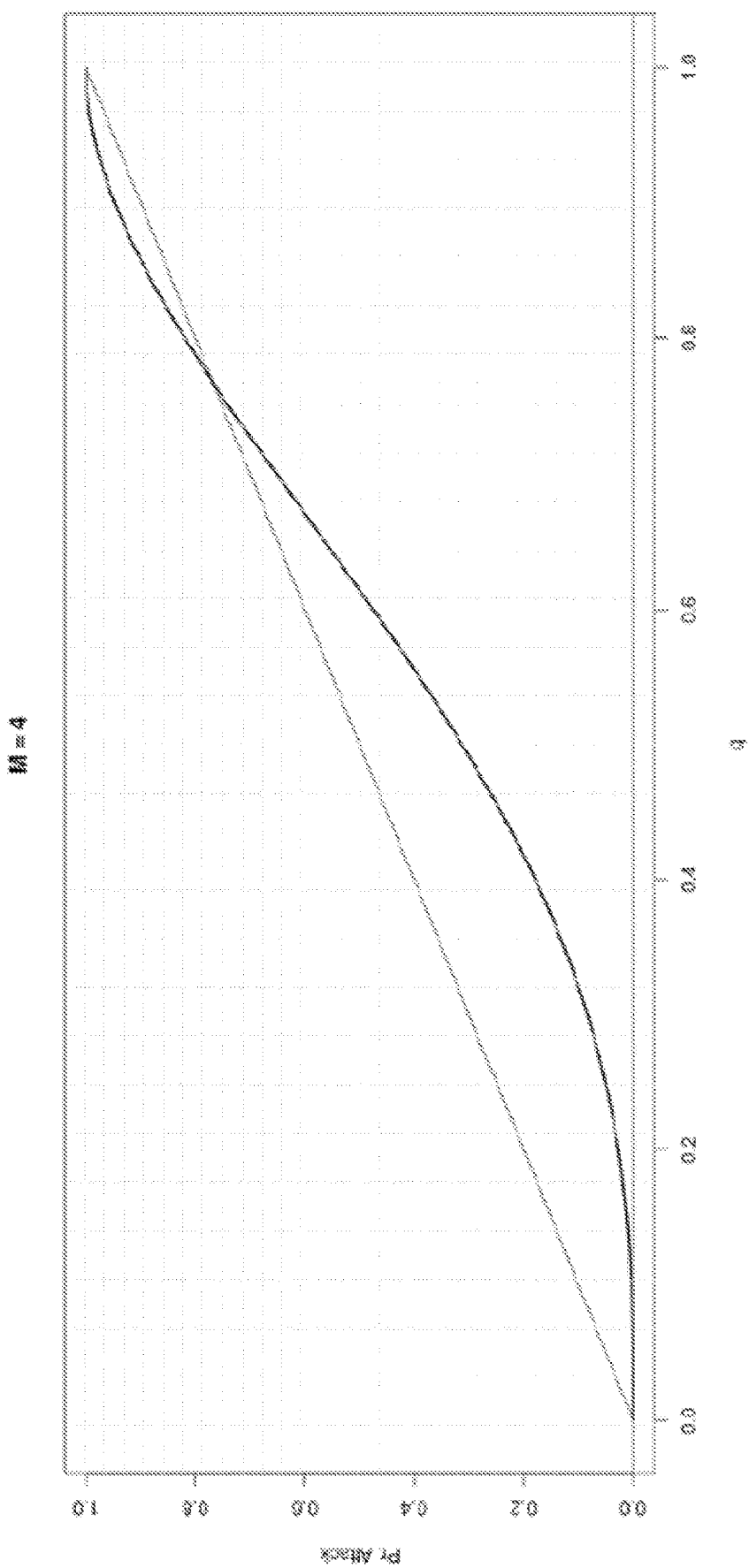
FIG. 10 illustrates a plot showing a probability to have an attack, for a case of four third-party providers, as a function of a probability that a third-party provider fails, in accordance with the system of FIG. 2.

Consider for each value of q, again in the example case of n=10, the probability to have an attack; considering an example for the optimal degree of g being equal to n/2. FIG. 8 illustrates a plot showing an example for the result. On the vertical axis, there is the probability to have an attack, for the case n=10, as a function of q, computed for the optimal g=n/2; where the straight line is y=x. As shown, for values of q below 0.55, there is an improvement in the total probability to have an attack. For q smaller than 0.2, the improvement amounts to several orders of magnitude. FIG. 9 illustrates a plot showing, on the vertical axis, the probability to have an attack, for the case n=50, as a function of q, computed for the optimal g=n/2; where the straight line is y=x. FIG. 10 illustrates a plot showing, on the vertical axis, the probability to have an attack, for the case n=4, as a function of q, computed for the optimal g=n/2; where the straight line is y=x.

Two assumptions are generally made for the security of the embodiments described herein. First, at least one of the third-party providers is honest and sound; i.e. they do not coordinate with other third-party providers and does not reveal any of the keys to anyone that should not have access to the key. Second, the keys are correctly prepared; i.e., none of the other parties (interlopers, the third-party providers, and/or the manufacturer of the device) know all the sets of keys on or sent to any device.

Advantageously, the present embodiments allow for scalability. In a network, the number, n, of users can be very large. With a large number of users, if one user were to require each user to share a key with another user, this would require $n(n-1)/2$ (i.e., in the order $n^2$) numbers of keys; which can be extremely large. In contrast, using a third-party provider, as in the present embodiments, can reduce the total number of keys, such as only requiring in the order of n keys. This is because each user only needs to share a key with a third-party provider, instead of the other users. The same scaling, of order n, number of keys will also apply in the case of multiple, e.g., m, third-party providers.

Advantageously, the present embodiments can be implemented via modification of various regimes, for example, IPSec and VPN.

Advantageously, the present embodiments allow for the use of a plurality of third-party providers for greater security and reliability. For example, in an approach with only one third-party provider, there is generally a single node of failure; thus, the probability of having a data breach is the probability of having a data breach in that third-party provider (referred to as p). In the present embodiments with a plurality of third-party providers, the probability of data breach is effectively arbitrarily small, even with the probability of having data breaches in each single third-party provider is still equal to p. Thus, with realistic values of p (e.g., p smaller than 20%), the probability of having a data breach with, for example, ten third-party providers is several orders of magnitude smaller than a single third-party provider p. In an example, for p equal to 0.05 on a yearly bases (i.e., on average one data breach every 20 years), with ten third-party providers, the probability of having a data breach is approximately 0.0001% (i.e., on average one data breach every 1,000,000 years).

The use of third-party providers as described in the present embodiments provides, at least, the following advantages:

Information-theoretical security when combined with OTP encryption.

Easy implementation with current technology (such as in the use of virtual private networks (VPN)).

Third-party providers can be off-line during the communication of encrypted data (after the key generation procedure); which can mitigate delays or denial-of-service attacks.

Highly scalable in terms of the number of users; whereby if new users join, old users are not affected as the third-party providers provide new key tables to the new users.

Highly scalable in terms of the number of third-party providers; whereby if users increase by k, the number of third-party providers to ensure security, with the number of key tables for each user, simply scales linearly with k.

Minimal time delay in the resulting communication due to not requiring third-party provider communication after key generation. In an example experiment for a VPN using two third-party providers, a ping time for communication was 90 ms; which is a significant improvement over other approaches.

Secret sharing reduces failure probability.

Government enforcement is possible by enforcing a legal requirement on its own third-party providers to surrender key tables to law enforcement.

International cooperation can be implemented; for example, each country owns a third-party provider, then, unless all countries cooperate, the communication remains secure against any individual country.

A hierarchical design of third-party providers can be implemented such that, for example, each country/major organization has its primary third-party provider and it distributes trust among a set of secondary third-party providers.

Further, the use of multiple third-party providers provides at least the following advantages:

No need for the users to trust in the single centralized entity. As third-party providers are operated independently, no single third-party provider is actually able to decrypt Alice and Bob's communication. In this way, users do not have to share their data with the third-party provider.

Reduce the probability of hack or data breach from a single node or a single point of failure by using multitude third-party providers; in addition to providing protection against DDOS attacks.

Allows users to dynamically choose which third-party providers to use for the communication.

Does not require messages from Alice to Bob to pass through the third-party providers; thus not requiring the third-party provider(s) to be always online for the communication to take place. Alice and Bob can instruct the third-party providers to provide a certain amount of keys now in expectation of a communication happening later. When the communication happens later, the third-party providers do not have to be online.

In an example of the present embodiments, Alice can simply send to the third-party providers (i) Bob's address and (i) the length of the message that she separately sent to Bob. The Hub then prepares the key instruction (which is as long as the message) and sends those to Bob. In comparison, in other approaches, a centralized entity receives the message from Alice and re-transmits the message to Bob; so the entity has to disadvantageously manage double the traffic.

Moreover, key authentication can be importantly used to ensure integrity of data transmitted. If two parties share a common string of random numbers, taking the form as the key, then they can achieve information-theoretic secure communication via a one-time-pad approach and information-theoretic secure authentication via, for example, Wegman-Carter approach.

In further cases, the key generation and distribution of the present embodiments can be used for other suitable applications in which trust can be distributed among the various third-party providers. For example, the key generation scheme can be used for authentication between the first user computing device and the second user computing device without requiring direct communication during key generation. If the generated common key is used in authentication, no individual third-party providers can forge communications or digital documents. Such an application can be used over anonymity networks, such as 'Tor', to allow authenticated anonymous communications. In other cases, the key generation and distribution of the present embodiments can be used for distribution of key hashes for, for example, blockchain or other distributed ledger implementations. With encryption applications, the present embodiments can be used to achieve secure communication; where no individual third-party providers can themselves break the encryption scheme.

Accordingly, the present embodiments can be used for any suitable cryptographic application that includes authentication to provide information-theoretically secure authentication.

In other example applications, the key generation and distribution of the present embodiments can be used to achieve, for example, multi-party secure computation, Byzantine agreement protocols, and distributed ledgers.

Although the invention has been described with reference to certain specific embodiments, various other aspects, advantages and modifications thereof will be apparent to those skilled in the art without departing from the spirit and scope of the invention as outlined in the claims appended hereto. The entire disclosures of all references recited above are incorporated herein by reference.

The invention claimed is:

1. A method for key generation between a first user computing device and a second user computing device without requiring direct communication during key generation between the first user computing device and the second user computing device, the method for key generation using a plurality of third-party providers each comprising a computing device, the method for key generation using a first private table comprising values with associated indexes each shared with the first user computing device and one of the third-party providers and a second private table comprising values with associated indexes each shared with the second user computing device and one of the third-party providers, the method comprising:
performing by the second user computing device:
receiving indexes each associated with a value in the second private table, each index received from the respective third-party provider sharing those values, each index associated with a value that matches an indexed value in the first private table received by the respective third-party provider from the first user computing device; and
generating a common key by combining the indexed values of the second private table.

2. The method of claim 1, wherein generating the common key comprises performing exclusive-or (XOR) operations on the indexed values of the second private table.

3. The method of claim 2, further comprising using the common key to securely communicate between the first user computing device and the second user computing device using a one-time-pad (OTP) encryption approach.

4. The method of claim 3, wherein the number of indexed values represent the number of bits to be communicated by the first user computing device to the second user computing device.

5. The method of claim 1, further comprising using the common key to authenticate communications between the first user computing device and the second user computing device using a Wegman-Carter approach.

6. The method of claim 1, further comprising marking as used, by the second user computing device, values in the second private table that have been used to generate the common key.

7. The method of claim 1, further comprising performing erasure, by the second user computing device, of values in the second private table that have been used to generate the common key.

8. The method of claim 1, further comprising performing, by the second computing device, encryption of messages using the common key.

9. The method of claim 1, further comprising performing, by the second user computing device, private key authentication using the common key.

10. The method of claim 1, wherein receiving the indexes associated with the values in the second private table comprises receiving values determined by performing exclusive-or (XOR) operations, by each respective third-party provider, on the indexed values in the first private table and the second private table.

11. A system for key generation for secure communication with a first user computing device without requiring direct communication during key generation with the first user computing device, the system comprising one or more processors and a data storage, the system in communication with one or more third-party providers each comprising a computing device, a first private table comprising values with associated indexes each shared with the first user computing device and one of the third-party providers, the one or more processors in communication with the data storage device and configured to:
receive indexes each associated with a value in a second private table, the second private table comprising values with associated indexes each shared with one of the third-party providers, each index received from the respective third-party provider sharing those values, each index associated with a value that matches an indexed value in the first private table received by the respective third-party provider from the first user computing device; and
generate a common key for the secure communication by combining the indexed values of the second private table.

12. The system of claim 11, wherein generating the common key is by performing exclusive-or (XOR) operations on the indexed values of the second private table.

13. The system of claim 12, wherein the one or more processors are further configured to use the common key to securely communicate with the first user computing device using a one-time-pad (OTP) encryption approach.

14. The system of claim 13, wherein the number of indexed values represent the number of bits to be communicated by the first user computing device.

15. The system of claim 11, wherein the one or more processors are further configured to use the common key to authenticate communications between the first user computing device and the second user computing device using a Wegman-Carter approach.

16. The system of claim 11, wherein the one or more processors are further configured to mark, as used, values in the second private table that have been used to generate the common key.

17. The system of claim 11, wherein the one or more processors are further configured to perform erasure of values in the second private table that have been used to generate the common key.

18. The system of claim 11, wherein the one or more processors are further configured to perform encryption of messages using the common key.

19. The system of claim 11, wherein the one or more processors are further configured to perform private key authentication using the common key.

20. The system of claim 11, wherein receiving the indexes associated with the values in the second private table comprises receiving values determined by performing exclusive-or (XOR) operations, by each respective third-party provider, on the indexed values in the first private table and the second private table.

* * * * *